United States Patent [19]
Komoda

[11] Patent Number: 5,619,440
[45] Date of Patent: Apr. 8, 1997

[54] MULTIPLIER CIRCUIT WITH ROUNDING-OFF FUNCTION

[75] Inventor: Michio Komoda, Itami, Japan

[73] Assignee: Mitsubishi Denki Kabushiki Kaisha, Tokyo, Japan

[21] Appl. No.: 433,013

[22] Filed: May 3, 1995

Related U.S. Application Data

[62] Division of Ser. No. 212,926, Mar. 15, 1994, Pat. No. 5,444,647.

[30] Foreign Application Priority Data

Mar. 22, 1993 [JP] Japan ................... 5-061832

[51] Int. Cl.⁶ .............................. G06F 7/52
[52] U.S. Cl. .............................. 364/754
[58] Field of Search ................. 364/754, 757, 364/758

[56] References Cited

U.S. PATENT DOCUMENTS

| | | |
|---|---|---|
| 3,623,012 | 12/1971 | Lowry et al. . |
| 3,885,141 | 5/1975 | Kieburtz . |
| 4,153,938 | 5/1979 | Ghest et al. . |
| 4,648,058 | 3/1987 | Masumoto . |
| 4,982,355 | 1/1991 | Nishimura et al. ........ 364/758 |
| 5,007,009 | 4/1991 | Azetsu . |
| 5,010,510 | 4/1991 | Nishimura et al. ........ 364/758 |
| 5,142,490 | 8/1992 | Tsujihashi et al. ........ 364/757 |

FOREIGN PATENT DOCUMENTS

| | | |
|---|---|---|
| 3901995 | 8/1989 | Germany . |
| 3909713 | 4/1990 | Germany . |

Primary Examiner—Tan V. Mai
Attorney, Agent, or Firm—Oblon, Spivak, McClelland, Maier & Neustadt, P.C.

[57] ABSTRACT

A multiplier circuit having a rounding-off function. A multiplier circuit has a smaller circuit size and operates at a higher speed by using a rounding half adder. An addition processing part which receives partial products from a partial product generating part, includes in its first stage two half adders and a rounding half adder. Its second stage includes three full adders, as does its third stage. Its fourth stage includes a three-bit carry look ahead adder. The output of the rounding half adder is the sum of the two inputs and an auxiliary value, such as 1. By utilizing the rounding half adder, a separate rounding circuit is unnecessary.

12 Claims, 22 Drawing Sheets

MULTIPLIER CIRCUIT WITH ROUNDING-OFF FUNCTION

This is a division of application Ser. No. 08/212,926 filed on Mar. 15, 1994 now U.S. Pat. No. 5,444,647.

BACKGROUND OF THE INVENTION

1. Field of the Invention

The present invention relates to a multiplier circuit, and more particularly, to those equipped with a round-off function.

2. Description of the Prior Art

FIGS. 21 and 22 are circuitry diagrams each showing a partial structure of a conventional multiplier circuit 100. In combination, FIGS. 21 and 22 show the entire structure of the multiplier circuit 100.

A multiplicand 1a (=$A_3 A_2 A_1 A_0$) and a multiplier 1b (=$B_3 B_2 B_1 B_0$) which are to be given to the multiplier circuit 100 are each expressed in binary 4 bits. The multiplicand 1a and the multiplier 1b are multiplied at a carry-save multiplier part 30 to yield a first multiplication result 4 (=$P'_7 P'_6 P'_5 P'_4 P'_3 P'_2 P'_1 P'_0$). The sixth most significant bit of the multiplication result 4 is rounded off at a fraction rounding-off circuit 5, whereby a binary 5-bit second multiplication result 2 (=$P_7 P_6 P_5 P_4 P_3$) is obtained. As herein used, a subscription i of data (=0, 1, 2, 3) represents the digit of $2^i$. "To round off" means to calculate a round number, and corresponds to rounding off of the fractions in the decimal system.

The multiplier part 30 is formed by a partial product generating part 30a and an addition processing part 30b. The partial product generating part 30a generates a partial product group 6 from the multiplicand 1a and the multiplier 1b. The addition processing part 30b performs a carry-save addition using half adders 7a to 7c, full adders 8a to 8f and a carry look ahead high-speed adder 9 while aligning the digits of the partial product group 6. The dotted grids in the addition processing part 30b represent how the digits are aligned and stages at which an addition is performed.

FIG. 23 is a circuitry diagram showing a structure of a conventional division circuit 200. A dividend A and a divisor B which are to be given to the division circuit 200 are each expressed in binary 8 bits and satisfy a relation A<B. The dividend A and the divisor B are supplied to a 9-bit division circuit 10 which calculates a quotient Q' which includes decimal 9 bits. The quotient Q' is given to the rounding circuit 5 which rounds off the decimal ninth bit of the quotient Q' and outputs an 8-bit quotient Q.

FIG. 24 is a circuitry diagram showing the details of the 9-bit division circuit 10. The 9-bit division circuit 10 comprises 1-bit quotient determining circuits 12a, 12b, . . . 12i. First, 9-bit data which is obtained by adding 0 to the lower bit side of the dividend A is divided by the divisor B at the 1-bit quotient determining circuit 12a, and the resulting most significant bit is determined as a 1-bit quotient $q'_8$. At the same time, an 8-bit remainder $R_8$ is calculated.

Next, 9-bit data which is obtained by adding 0 to the lower bit side of the 8-bit remainder $R_8$ is divided by the divisor B at the 1-bit quotient determining circuit 12b, and the resulting most significant bit is determined as a 1-bit quotient $q'_7$ and a remainder $R_7$ is calculated. In this manner, 1-bit quotients are serially calculated until a 1-bit quotient $q'_0$ is finally calculated. Thus, the 9-bit quotient Q' (=$q'_8 q'_7 q'_6 q'_5 q'_4 q'_3 q'_2 q'_1 q'_0$) is found.

Having such structures as above, the conventional multiplier circuit and the conventional division circuit need a rounding circuit, which results in an increase in the number of process stages, a larger circuit size and a delayed operation speed.

SUMMARY OF THE INVENTION

A multiplier circuit according to the present invention comprises: (a) a partial product generating part for generating a plurality of partial products from a plurality of multiplicand elements and a plurality of multiplier elements, the multiplicand elements each being at least one digit which forms a multiplicand A (=$A_{(M-1)} \ldots A_1 A_0$) which is expressed in M digits in a D-ary, the multiplier elements each being at least one digit which forms a multiplier B (=$B_{(N-1)} \ldots B_1 B_0$) which is expressed in N digits in the D-ary; and (b) an addition processing part for adding up the partial products while aligning the partial products digit to digit to each other. The addition processing part comprises (b-1) a rounding adder which includes a first and a second input terminals for each receiving a 1-digit value and a first and a second output terminals, a value which is available at the first output terminal of the rounding adder being a relatively higher digit of a sum of values which are given to the first and the second input terminals and an auxiliary number, a value which is available at the second output terminal of the rounding adder being a relatively lower digit of the sum of the values which are given to the first and the second input terminals and the auxiliary number, the rounding adder being located at a position which corresponds to the K-th most significant digit of a product E of the multiplicand A and the multiplier B.

Preferably, the auxiliary number is a minimum value which is equal to or larger than a half of the number D.

Preferably, the number D is 2 and the auxiliary number is 1.

The rounding adder may comprise: (b-1-1) a first gate which includes a first, a second and a third terminals, the first terminal being connected to the first input terminal, the second terminal being connected to the second input terminal, the third terminal providing the first output terminal with an OR of values which are given to the first and the second terminals of the first gate; and (b-1-2) a second gate which includes a first, a second and a third terminals, the first terminal being connected to the first input terminal, the second terminal being connected to the second input terminal, the third terminal providing the second output terminal with an exclusive NOR of values which are given to the first and the second terminals of the second gate.

Preferably, the multiplier elements, the multiplicand elements and the partial products are all 1-digit value "0" or "1," and the partial product generating part comprises (a–1) M×N gates for each obtaining, as one of the partial products, a logical product $C_{mn}$ of one of the multiplicand elements $A_m$ which corresponds to the m-th digit of the multiplicand A ($0 \leq m \leq M-1$) and one of the multiplier elements $B_n$ which corresponds to the n-th digit of the multiplier B ($0 \leq n \leq N-1$).

In a first aspect of the multiplier circuit, the addition processing part further comprises: (b–2) a first adder group which is formed by (M–1) half adders; (b–3) a k-th adder group which is formed by (M–1) full adders ($2 \leq k \leq N-1$); and (b–4) a carry look ahead adder which has input terminals for (M–1) digits and output terminals for M digits. In the addition processing part, (c–1) one of the partial products $C_{(M-1)j}$ ($1 \leq j \leq N-2$) is supplied to a most significant digit full adder of the (j+1)-th adder group; (c–2) one of the partial products $C_{ij}$ ($0 \leq i \leq M-2, 2 \leq j \leq N-1$) is supplied to an (i+1)-th least significant digit full adder of the j-th adder group; (c–3) one of the partial products $C_{i1}$ ($0 \leq i \leq M-2$) is supplied to an (i+1)-th least significant digit half adder of the first adder group; (c–4) one of the partial products $C_{i0}$ ($0 \leq i \leq M-1$) is supplied to an i-th least significant digit half adder of the first adder group; (c–5) the most significant digit input terminal of the carry look ahead adder is provided with one of the partial products $C_{(M-1)(N-1)}$ and a relatively higher digit of an output of the most significant digit full adder of the (N–1)-th adder group; (c–6) a p-th least significant digit input terminal ($1 \leq p \leq (M-2)$) of the carry look ahead adder is provided with a relatively higher digit of an output of a p-th least significant digit full adder of the (N –1)-th adder group and a relatively lower digit of an output of a (p+1)-th least significant digit full adder of the (N–1)-th adder group; (c–7) a p-th least significant digit full adder of the j-th adder group ($3 \leq j \leq N-1$) is provided with a relatively lower digit of an output of a (p+1)-th least significant digit full adder of the (j–1)-th adder group and a relatively higher digit of an output of a p-th least significant digit full adder of the (J–1)-th adder group; (c–8) the most significant digit full adder of the j-th adder group is further provided with a relatively higher digit of an output of the most significant digit full adder of the (j–1)-th adder group; (c–9) a p-th least significant digit full adder of the second adder group is provided with a relatively lower digit of an output of a (p+1)-th least significant digit half adder of the first adder group and a relatively higher digit of an output of a p-th least significant digit half adder of the first adder group; and (c–10) the most significant digit full adder of the second adder group is provided with a relatively higher digit of an output of the most significant digit half adder of the first adder group. Of the first adder group, the half adder which is located at a position which corresponds to the K-th most significant digit of a product E is the rounding adder.

In the first aspect of the multiplier circuit, the numbers M and N may be equal to each other.

In a second aspect of the multiplier circuit, the addition processing part forms a Wallace tree circuit.

In the second aspect of the multiplier circuit, the numbers M and N may be equal to each other.

In a third aspect of the multiplier circuit, the multiplier and the multiplicand are each expressed as a complement of 2 if they are negative numbers, the multiplicand corresponds to the multiplicand elements, the multiplier elements are formed by a plurality of digits which are successive in the multiplier, the partial product generating part comprises a plurality of Booth partial product generating circuits which generate the partial products according to the Booth algorithm, and the addition processing part adds up the partial products while aligning the most significant digits of the partial products to each other.

Preferably, the number N is an even number, the plural of multiplier elements are divided into a 0-th to an i-th 3-digit multiplier elements ($B_{2i+1}$ $B_{2i}$ $B_{2i-1}$) where $0 \leq i \leq (N-2)/2$ and $B_{-1}=0$, the partial products are divided into a 0-th to an i-th partial products which are obtainable by performing a predetermined calculation on the multiplicand elements and the 0-th to the i-th multiplier elements. The addition processing pan further comprises: (b–2) a first adder group which includes a plurality of half adders which are provided in correspondence with the 0-th partial product except for the least two significant bits of the 0-th partial product and with the first partial product; (b–3) a (j+1)-th adder group which includes: (b–3–1) j half adders which are provided successively at the lower digit side, lower digit (j+1) outputs of the j adder group ($1 \leq j \leq (N-2)/2-1$) being given to the j-th adder group with their digits aligned to each other; and (b–3–2) full adders which are provided successively at the higher digit side, outputs of the j-th adder group and the (j +1)-th partial product being given to the full adders in correspondence with each other. Of the half adders, one which is located at a position which corresponds to the K-th most significant digit of a product E is the rounding adder.

Preferably, the numbers M and N are equal to each other.

The present invention is also directed to a division circuit for dividing a dividend A ($=A_{(M-1)} \ldots A_1 A_0$) which is expressed in M digits in a D-ary by a divisor B ($=B_{(N-1)} \ldots B_1 B_0$) which is expressed in N digits in the D-ary and which is larger than the dividend A and for calculating a quotient which is rounded off at the (K+1)-th digit down from a radix point and therefore which includes K digits, the division circuit comprising: (x–1) adder means for adding up the dividend A and at least (2N–M–1)-th most significant digit while aligning the most significant digit of the divisor B to a digit of $D^{(N-K-2)}$ and the least significant digit of the dividend A to a digit of $D^0$, thereby obtaining a dividend C; and (x–2) a division processing part for dividing the dividend C by the divisor B to thereby calculate a quotient which includes K digits down from the radix point.

Preferably, the number D is 2.

Preferably, the numbers M and N arc equal to each other.

In a first aspect of the division circuit for dividing a dividend A ($=A_{(M-1)} \ldots A_1 A_0$) which is expressed in M digits in a D-ary by a divisor B ($=B_{(N-1)} \ldots B_1 B_0$) which is expressed in N digits in the D-ary and which is larger than the dividend A, the division circuit comprises: (a–1) an i-th quotient determining part which includes a first input terminal, a second input terminal for receiving the divisor B, a third input terminal and a first and a second output terminals, the i-th quotient determining part adding a value which is given to the third input terminal to the end of a value which is given to the first input terminal and dividing a resultant value by the divisor B to thereby obtain a 1-digit i-th quotient ($1 \leq i \leq (2N-M-2)$) and an i-th remainder $R_i$, the i-th quotient and the i-th remainder $R_i$ being outputted to the first and the second output terminals, respectively; and (a–2) a (2N–M–1)-th quotient determining part which includes a first input terminal, a second input terminal for receiving the divisor B, a third input terminal and an output terminal, the (2N–M–1)-th quotient determining part adding a value which is given to the third input terminal to the end of a value which is given to the first input terminal and dividing a resultant value by the divisor B to thereby obtain a 1-digit (2N–M–1)-th quotient, the (2N–M–1)-th quotient being outputted to the output terminal. The division circuit is characterized in that (b–1) the dividend A is given to the first input terminal of the first quotient determining part, (b–2) the (j–1)-th remainder $R_{(j-1)}$ is given to the first input terminal of the j-th quotient determining part ($2 \leq j \leq (2N-M-1)$), (c–1) an i-th most significant digit value $B_{(N-i)}$ is given to the third terminal of the i-th quotient determining part, and (c–2) a (2N–M–1)-th most significant digit value $B_{(M-N+1)}$ of the divisor B is given to the third terminal of the (2N–M–1)-th quotient determining part.

In the first aspect of the division circuit, the number D is preferably 2.

In the first aspect of the division circuit, the numbers M and N are preferably equal to each other.

In a second aspect of the division circuit for dividing a dividend A ($=A_{(M-1)} \ldots A_1 A_0$) which is expressed in M digits in a D-ary by a divisor B ($=B_{(N-1)} \ldots B_1 B_0$) which is expressed in N digits in the D-ary and which is larger than the dividend A, the division circuit comprises: (a–1) an i-th quotient determining part which includes a first input terminal, a second input terminal for receiving the divisor B, a third input terminal and a first and a second output terminals, the i-th quotient determining part adding a value which is given to the third input terminal to the end of a value which is given to the first input terminal and dividing a resultant value by the divisor B to thereby obtain a 1-digit i-th quotient ($1 \leq i \leq (N-M+K-1)$, $K > (N-1)$) and an i-th remainder $R_i$, the i-th quotient and the i-th remainder $R_i$ being outputted to the first and the second output terminals, respectively; and (a–2) an (N–M+K)-th quotient determining part which includes a first input terminal, a second input terminal for receiving the divisor B, a third input terminal and an output terminal, the (N–M+K)-th quotient determining part adding a value which is given to the third input terminal to the end of a value which is given to the first input terminal and dividing a resultant value by the divisor B to thereby obtain a 1-digit (N–M+K)-th quotient, the (N–M+K)-th quotient being outputted to the output terminal. The division circuit is characterized in that (b–1) the dividend A is given to the first input terminal of the first quotient determining part, (b–2) the (j–1)-th remainder $R_{(j-1)}$ is given to the first input terminal of the j-th quotient determining part ($2 \leq j \leq (N-M+K)$), (c–1) a value "0" is given to the third terminal of the k-th quotient determining part ($1 \leq j \leq (K-N+1)$), (c–2) a (m–(K–N+1))-th most significant digit value $B_{(N-(m-K-N+1))}$ of the divisor B is given to the third terminal of the m-th quotient determining part (($K-N+2) \leq m \leq (N-M+K-1)$), and (c–3) a (2N–M–1)-th most significant digit value $B_{(M-N+1)}$ of the divisor B is given to the third terminal of the (N–M+K)-th quotient determining part.

In the second aspect of the division circuit, the number D is preferably 2.

In the second aspect of the division circuit, the numbers M and N are preferably equal to each other.

In a third aspect of the division circuit for dividing a dividend A ($=A_{(M-1)} \ldots A_1 A_0$) which is expressed in M digits in a D-ary by a divisor B ($=B_{(N-1)} \ldots B_1 B_0$) which is expressed in N digits in the D-ary and which is larger than the dividend A, the division circuit comprises: (a) an adder including a first and a second input terminals and an output terminal, the first input terminal receiving the dividend A, the second input terminal receiving a value $B_{(N-1)} B_{(N-2)} \ldots B_K B_{(K+1)}$ which corresponds to the most to the (N–1–K)-th most significant digits of the divisor B (K<N–1), the output terminal outputting an addition result which is obtained by adding up the values which are given to the first and the second input terminals while aligning the least significant bits of the values which are given to the first and the second input terminals to each other; (b–1) an i-th quotient determining part which includes a first input terminal, a second input terminal for receiving the divisor B, a third input terminal and a first and a second output terminals, the i-th quotient determining part adding a value which is given to the third input terminal to the end of a value which is given to the first input terminal and dividing a resultant value by the divisor B to thereby obtain a 1-digit i-th quotient ($1 \leq i \leq (N-M+K-1)$) and an i-th remainder $R_i$, the i-th quotient and the i-th remainder $R_i$ being outputted to the first and the second output terminals, respectively; and (b–2) an (N–M+K)-th quotient determining part which includes a first input terminal, a second input terminal for receiving the divisor B, a third input terminal and an output terminal, the (N–M+K)-th quotient determining part adding a value which is given to the third input terminal to the end of a value which is given to the first input terminal and dividing a resultant value by the divisor B to thereby obtain a 1-digit (N–M+K)-th quotient, the (N–M+K)-th quotient being outputted to the output terminal. The division circuit is characterized in that (c–1) the addition result is given to the first input terminal of the first quotient determining part, (c–2) the (j–1)-th remainder $R_{(j-1)}$ is given to the first input terminal of the j-th quotient determining part ($2 \leq j \leq (N-M+K)$), (d–1) an (i+(N–1–K))-th most significant digit value $B_{(K-i+1)}$ of the divisor B is given to the third terminal of the i-th quotient determining part, and (d–2) a (2N–M–1)-th most significant digit value $B_{(M-N+1)}$ of the divisor B is given to the third terminal of the (N–M+K)-th quotient determining part.

In the third aspect of the division circuit, the number D is preferably 2.

In the third aspect of the division circuit, the numbers M and N are preferably equal to each other.

In a fourth aspect of division circuit for dividing a dividend A ($=A_{(M-1)} \ldots A_1 A_0$) which is expressed in M digits in a D-ary by a divisor B ($=B_{(N-1)} \ldots B_1 B_0$) which is expressed in N digits in the D-ary and which is larger than the dividend A, the division circuit comprises: (a) an adder including a first and a second input terminals and an output terminal, the first input terminal receiving the dividend A, the second input terminal receiving a value $B_{(N-1)} B_{(N-2)} \ldots B_K B_{(K+1)}$ which corresponds to the most to the (N–1–K)-th most significant digits of the divisor B, the output terminal outputting an addition result which is obtained by adding up the values which are given to the first and the second input terminals while aligning the least significant bits of the values which are given to the first and the second input terminals to each other; (b–1) a first quotient determining part which includes a first and a second input terminals and a first and a second output terminals, the first input terminal receiving the addition result, the second input terminal receiving the divisor B, the first and the second output terminals respectively outputting a 1-digit first quotient and a first M-digit remainder $R_1$ which are obtainable by dividing the addition result by the divisor B; (b–2) an i-th quotient determining part which includes a first input terminal, a second input terminal for receiving the divisor B, a third input terminal and an output terminal, the i-th quotient determining part adding a value which is given to the third input terminal to the end of a value which is given to the first input terminal and dividing a resultant value by the divisor B to thereby obtain a 1-digit i-th quotient and an i-th remainder $R_i$ ($2 \leq i \leq (N-M+K)$), the i-th quotient and the i-th remainder $R_i$ being outputted to the first and the second output terminals, respectively; and (b–3) an (N–M+K+1)-th quotient determining part which includes a first input terminal, a second input terminal for receiving the divisor B, a third input terminal and an output terminal, the (N–M+K+1)-th quotient determining part adding a value which is given to the third input terminal to the end of a value which is given to the first input terminal and dividing a resultant (M+1)-digit value by the divisor B to thereby obtain a 1-digit (N–M+K+1)-th quotient, the (N–M+K+1)-th quotient being outputted to the output terminal. The division circuit is characterized in that (c–1) the (i–1)-th remainder $R_{(i-1)}$ is given to the first input terminal of the i-th quotient determining part, (c–2) the (N–M+K)-th remainder $R_{(N-M+K)}$ is given to the first input terminal of the (N–M+K+1)-th quotient determining part, (d–1) an (i+(N–2–K))-th most significant digit value $B_{(K-i+2)}$ of the divisor B is given to the third terminal of the i-th quotient determining part, and (d–2) a (2N–M–1)-th most significant digit value $B_{(M-N+1)}$ of the divisor B is given to the third terminal of the (N–M+K+1)-th quotient determining part.

In the fourth aspect of the division circuit, the number D is preferably 2.

In the fourth aspect of the division circuit, the numbers M and N are preferably equal to each other.

Thus, in the rounding adder of the multiplier circuit according to the present invention, the auxiliary number is added at a digit which is one digit lower than a digit which is to be rounded off. Hence, the rounded product E can be calculated without carrying calculations down to the (K–1)-th most significant digit.

The divisor C which is newly calculated at the division circuit according to the present invention is obtained in advance to calculate a rounded quotient. The divisor C needs not be completely calculated at one time. Rather, as in the first to the fourth aspects of the present invention, of the divisor C, digits which are needed at the respective quotient determining parts are calculated serially.

As described above, according to the present invention, a rounding off at the multiplier circuit and the division circuit is performed while executing a multiplication and a division. Hence, a need to provide an external rounding circuit is eliminated the number of calculation stages and the circuit size are reduced, and the operation speed is enhanced.

Especially in the multiplier circuit of the first aspect, since the carry-save method is used, the carry-over propagation path is shortened and the operation speed is enhanced.

The multiplier circuit of the second aspect, using the Wallace Tree multiplication method, requires less number of the addition processing parts than in the multiplier circuit of the first aspect.

The multiplier circuit of the third aspect uses the Booth algorithm, and therefore, it is possible to perform a calculation without correcting negative numbers which are each expressed as a complement of 2.

The division circuits of the first and the second aspects are particularly suitable to perform a calculation when there are relations K=N–1 and K>N–1, respectively.

The division circuits of the third and the fourth aspects are both suitable where there is a relation K<N–1. The division circuit of the third aspect is particularly suitable where it is known that a rounded quotient is smaller than 1, while the division circuit of the fourth aspect is particularly suitable where it is not known that a rounded quotient is smaller than 1.

Accordingly, it is an object of the present invention to offer a multiplier circuit and a division circuit which require only a small circuit size and perform a rounding off at a high speed.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Multiplier Circuit:

(A–0) Basic Idea:

Prior to detailed description of the present invention, a basic idea of the present invention will be explained. Assume that 4-bit integers are to be multiplied and a multiplication result is to be rounded off to leave the most five significant bits. Such is attainable by leaving the multiplication result as it is if the sixth most significant bit (digit of $2^2$) is "0," and by adding "1" to the fifth most significant bit (digit of $2^3$) of the multiplication result if the sixth most significant bit is "1." This calculation is conventionally performed after calculating the whole multiplication result.

However, the present invention, noting a fact that the process of calculating the whole multiplication result is dividable into a process of calculating partial products and a process of adding up the partial products, requires to perform a rounding off prior to calculation of the whole multiplication result.

In the example of the rounding off cited above, "leaving the multiplication result as it is if the sixth most significant bit (digit of $2^2$) is '0,' and adding '1' to the fifth most significant bit (digit of $2^3$) of the multiplication result if the sixth most significant bit is '1'" is equivalent to "adding '1' to the sixth most significant bit (digit of $2^2$) of the multiplication result." In other words, by calculating (multiplicand)×(multiplier)+100 in the binary system and emitting the $2^2$– and lower digits, a calculation result rounded off at the sixth most significant bit (digit of $2^2$) is obtained. In the following, "1" to be newly added to the sixth most significant bit will be referred to as "an auxiliary number."

That is, "rounding off a particular digit which is to be rounded off to thereby obtain a value for a digit which is not lower than the particular digit" is equivalent to "adding an auxiliary number to a digit which is one digit lower than the particular digit." On the other hand, as to an addition, the same addition result is obtained even if the sequence of addition processes are changed. Hence, no problem will be observed if the process of adding the auxiliary number is performed during a process of adding up partial products.

The present invention has been made noting this point. According to the present invention, a half adder which is exclusively equipped with a function of adding an auxiliary number is provided at a digit which is one digit lower than the particular digit.

Figure 1:
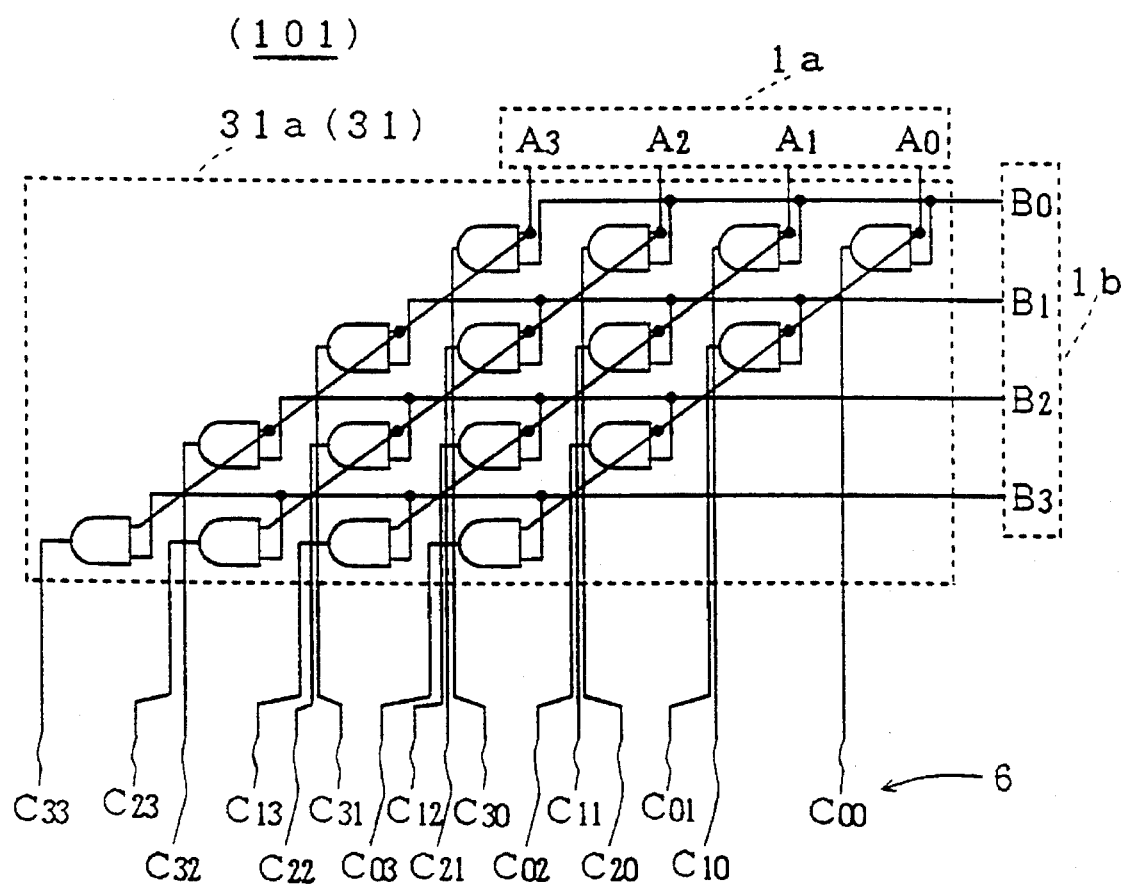
FIGS. 1 to 8 are circuit diagrams for explaining a first preferred embodiment of the present invention.
Figure 2:
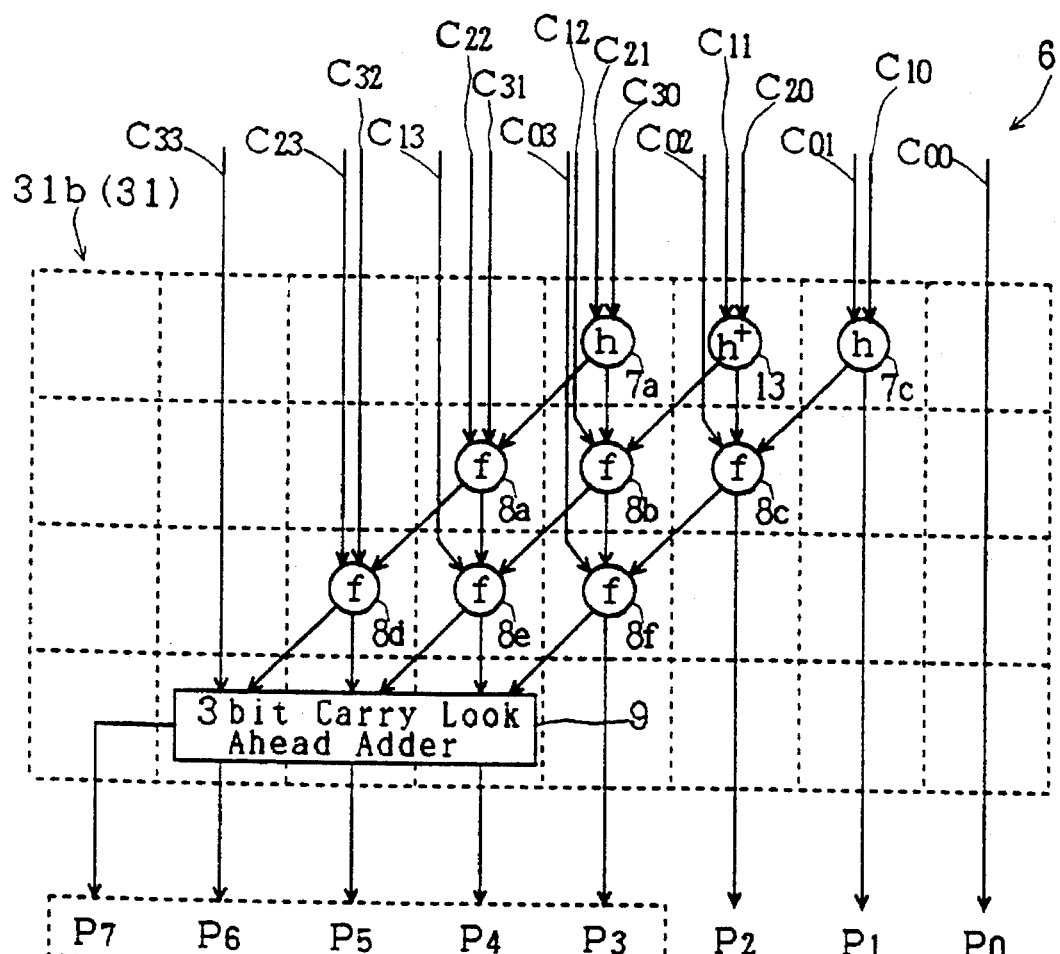

(A–1) First Preferred Embodiment:

FIGS. 1 and 2 are circuitry diagrams each showing a part of the structure of a multiplier circuit 101 according to the present invention. In combination, FIGS. 1 and 2 show the entire structure of the multiplier circuit 101.

A multiplicand 1a (=$A_3 A_2 A_1 A_0$) and a multiplier 1b (=$B_3 B_2 B_1 B_0$), each expressed in binary 4 bits, are inputted to the multiplier circuit 101. The sixth most significant bit is rounded off so that a binary 5-bit multiplication result 2 (=P$_7$ P$_6$ P$_5$ P$_4$ P$_3$) is obtained.

The multiplier circuit 101 comprises a carry-save addition part 31. Therefore, directly from the multiplicand 1a and the multiplier 1b, i.e., without using a rounding circuit which is provided external to the multiplier circuit 101, the multiplication result 2 is obtainable by rounding off the sixth most significant bit.

The addition part 31 is formed by a partial product generating part 31a and an addition processing part 31b. The partial product generating part 31a generates a partial product group 6 (which is formed by partial products $C_{ij}$ ($0 \leq i$, $j \leq 3$)) from the multiplicand 1a and the multiplier 1b, and has the same structure as that of the conventional partial product generating part 30a. The partial product generating part 31a is formed by 16 (=4×4) AND gates whose outputs form the partial product group 6. For example, a partial product $C_{30}$ represents a product of the most significant bit $A_3$ of the multiplicand 1a and the least significant bit $B_0$ of the multiplier 1b.

At the addition processing part 31b which receives the partial product group 6, an alignment of digits is carried out and stages at which an addition is performed are matched as shown by the dotted grids. In the description hereinafter, the addition process stages will be referred to by the number of the stages counted from the top stage. At the first stage, half adders 7a and 7c which are indicated at the encircled letter "h" and a rounding half adder 13 which is indicated at the encircled symbol "h$^+$" are provided. At the second stage, full adders 8a, 8b and 8c which are indicated at the encircled letter "f" are provided. At the third stage, full adders 8d, 8e and 8f which are indicated at the encircled letter "f" are provided. At the fourth, or the last stage, a 3-bit carry look ahead adder 9 is provided.

At the first stage, the partial product $C_{00}$ (=$A_0 B_0$) is not processed by any computation. The half adder 7c receives a partial product $C_{10}$ (=$A_1 B_0$) and a partial product $C_{01}$ (=$A_0 B_1$), and adds the two into a 2-bit result. The carry digit of this output (i.e., the higher bit) is given to the full adder 8c of the second stage. The rounding half adder 13 receives a partial product $C_{11}$ (=$A_1 B_1$) and a partial product $C_{20}$ (=$A_2 B_0$), adds these two partial products and 1, and outputs a 2-bit result. The higher bit of this output is given to the full adder 8b of the second stage while the lower bit of the output is given to the full adder 8c of the second stage. The half adder 7a receives a partial product $C_{21}$ (=$A_2 B_1$) and a partial product $C_{30}$ (=$A_3 B_0$). The higher bit and the lower bit of the total of these two partial products are given to the full adders 8a and 8b of the second stage, respectively.

At the second stage, the full adder 8a further receives a partial product $C_{22}$ (=$A_2 B_2$) and a partial product $C_{31}$ (=$A_3 B_1$), the full adder 8b further receives a partial product $C_{12}$ (=$A_1 B_2$) and the full adder 8c further receives a partial product $C_{02}$ (=$A_0 B_2$). Receiving the partial products, the respective full adders perform addition of the three inputs. In a similar manner, at the third stage, the full adder 8d, receiving a partial product $C_{23}$ (=$A_2 B_3$) and a partial product $C_{32}$ (=$A_3 B_2$) and the higher bit of the full adder 8a, outputs a 2-bit value. Receiving a partial product $C_{13}$ (=$A_1 B_3$), the lower bit of the output of the full adder 8a and the higher bit of the output of the full adder 8b, the full adder 8e outputs a 2-bit value. Receiving a partial product $C_{03}$ (=$A_0 B_3$), the lower bit of the output of the full adder 8b and the higher bit of the output of the full adder 8c, the full adder 8f outputs a 2-bit value.

At the fourth stage, to the 3-bit carry look ahead adder 9, a partial product $C_{33}$ (=$A_3 B_3$) and the higher bit of the output of the full adder 8d are given as aligned to each other at one digit, the lower bit of the output of the full adder 8d and the higher bit of the output of the full adder 8e are given as aligned to each other at one digit, and the lower bit of the output of the full adder 8e and the higher bit of the output of the full adder 8f are given as aligned to each other at one digit.

The lower bit of the output of the full adder 8f directly becomes the least significant bit P3 of the multiplication result 2. The remaining higher bits (P$_7$ P$_6$ P$_5$ P$_4$) of the multiplication result 2 are outputted from the 3-bit carry look ahead adder 9.

Figure 22:
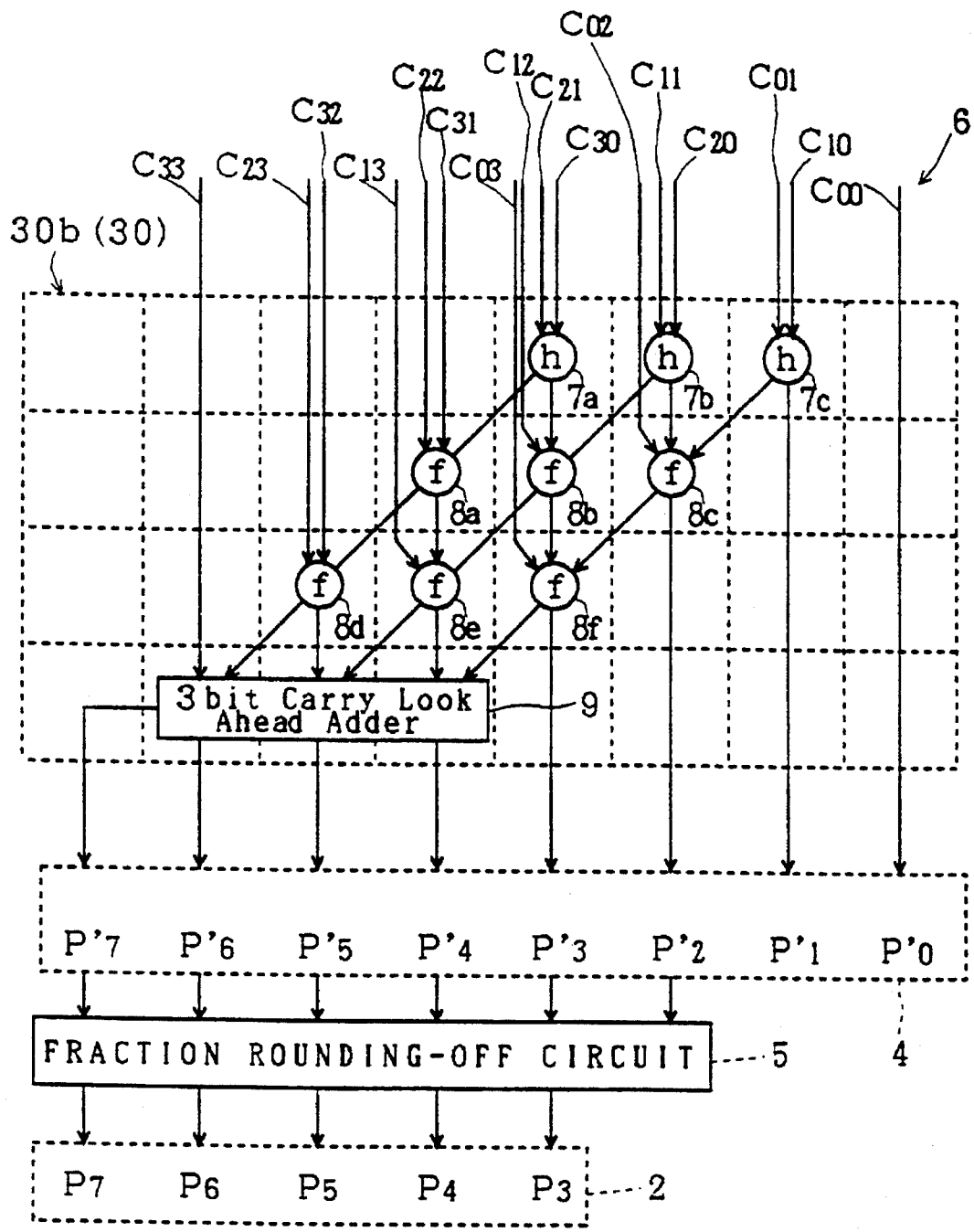
Figure 23:
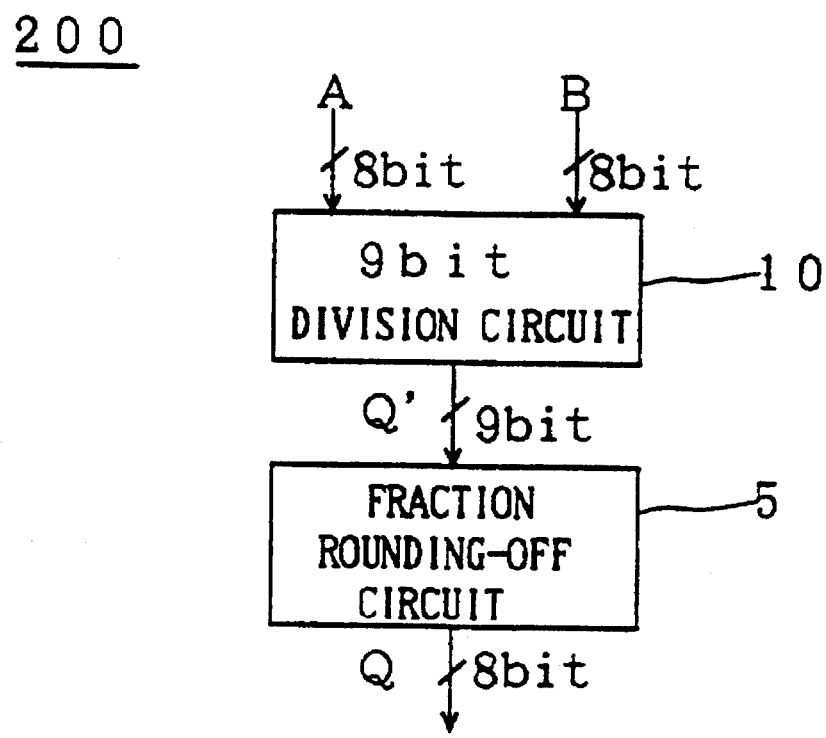
Figure 24:
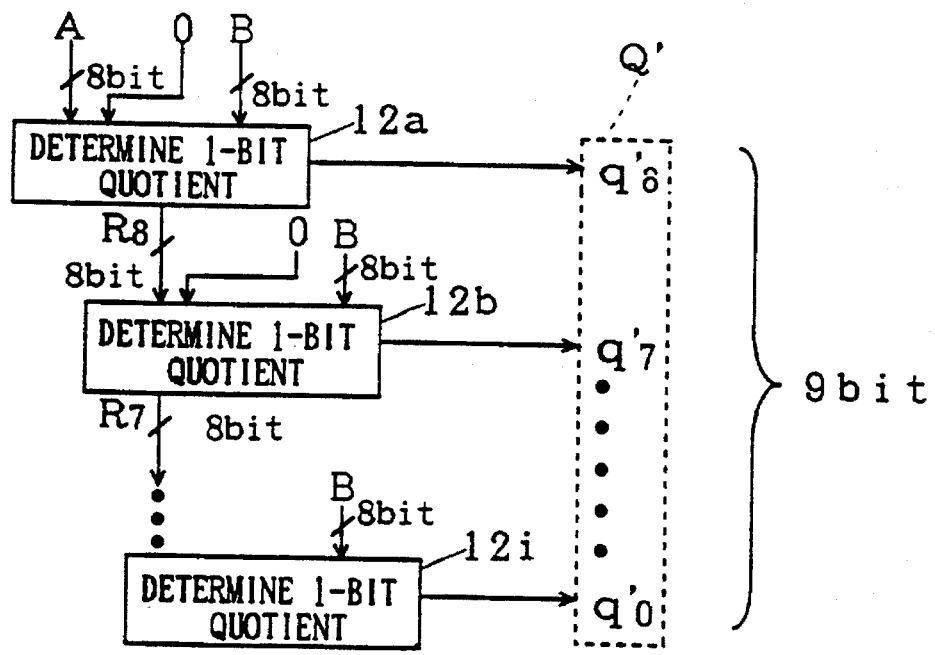

The rounding half adder 13 is located at a position where the sixth most significant bit is to be calculated, i.e., a position where the half adder 7b is to be disposed in the conventional addition processing part 30b which is shown in FIG. 22. This allows that an auxiliary number "1" is added to the sixth most significant bit. Hence, as explained in "(A-0) Basic Idea," the multiplication result 2 which was rounded off at the sixth most significant bit and which therefore includes the most to the fifth most significant bits is available from the multiplier circuit 101. Since the carry-save method is used in the first preferred embodiment, the carry-over propagation path is short, whereby a high-speed operation is enabled.

Figure 3:
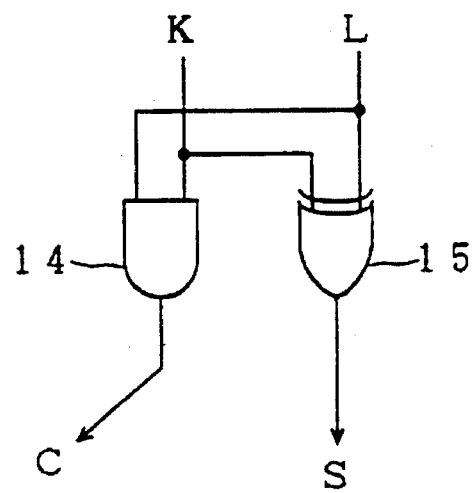
Figure 4:
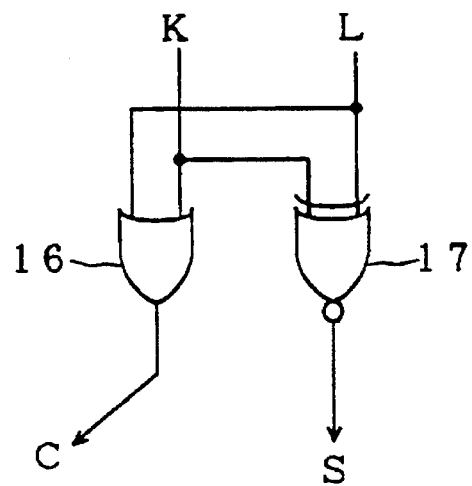

FIG. 3 is a circuitry diagram showing a structure of each half adder, typically the half adder 7a, of the addition processing part 31b. FIG. 4 is a circuitry diagram showing a structure of the rounding half adder 13. In FIGS. 3 and 4, inputs K and L correspond to the partial products which are shown in FIG. 2. Outputs C and S correspond to the higher bit and the lower bit of the output of the half adder 7a or the rounding half adder 13, respectively. The output C also corresponds to the carry digit. In the half adder 7a, an AND gate 14 and an EXOR gate 15 are each provided with the inputs K and L. The AND gate 14 outputs the output C and the EXOR gate 15 outputs the output S. Thus, the sum of "K" and "L" each consisting of one bit is obtained as a 2-bit value "CS."

On the other hand, at the rounding half adder 13, an OR gate 16 and an EXNOR gate 17 are each provided with the inputs K and L, and the OR gate 16 outputs the output C and the EXNOR gate 17 outputs the output S. Here, the sum of "K," "L" and the auxiliary number "1" is calculated as a 2-bit value "CS."

Figure 5:
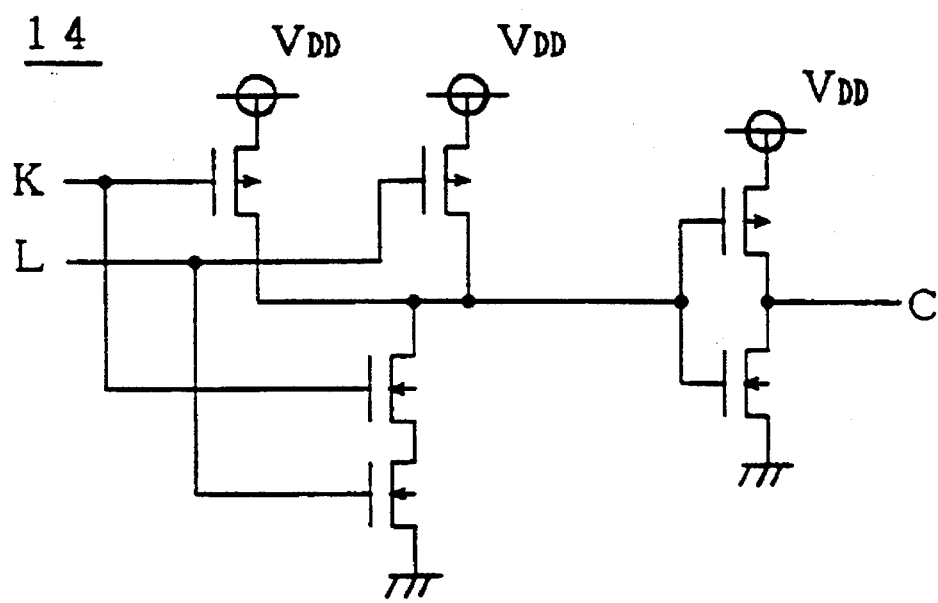
Figure 6:
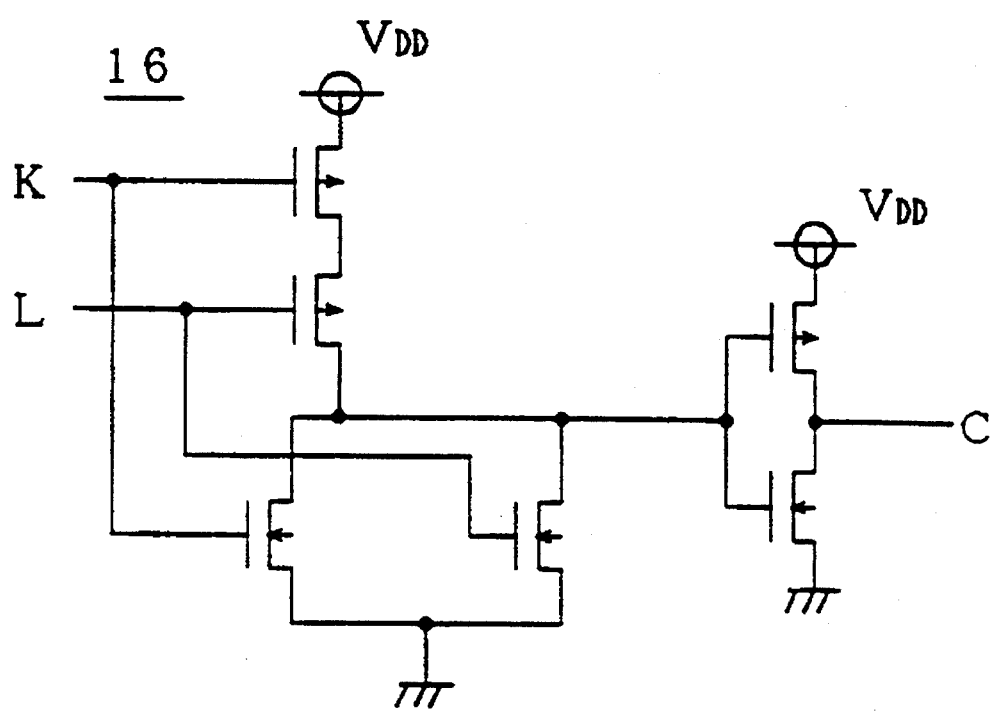
Figure 7:
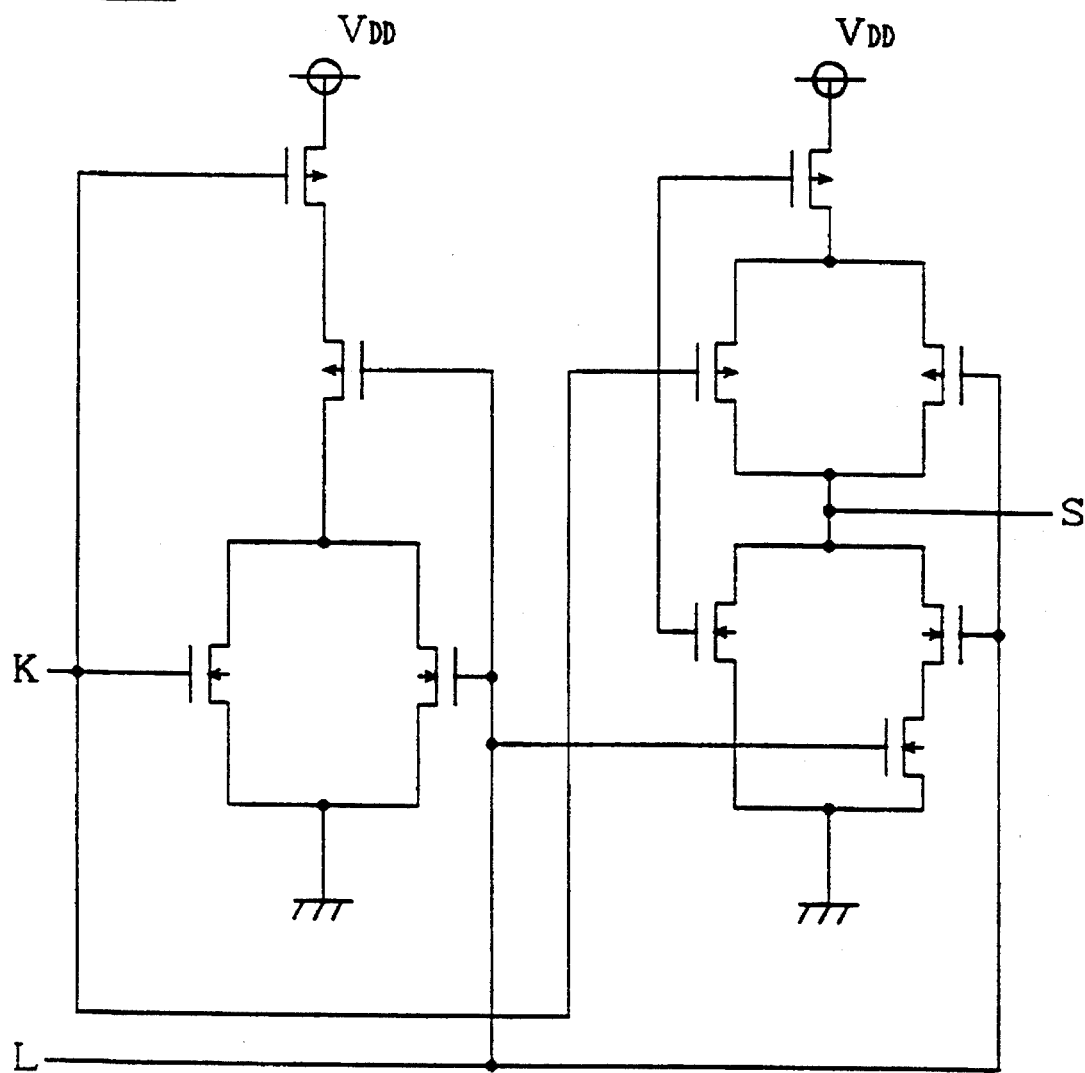
Figure 8:
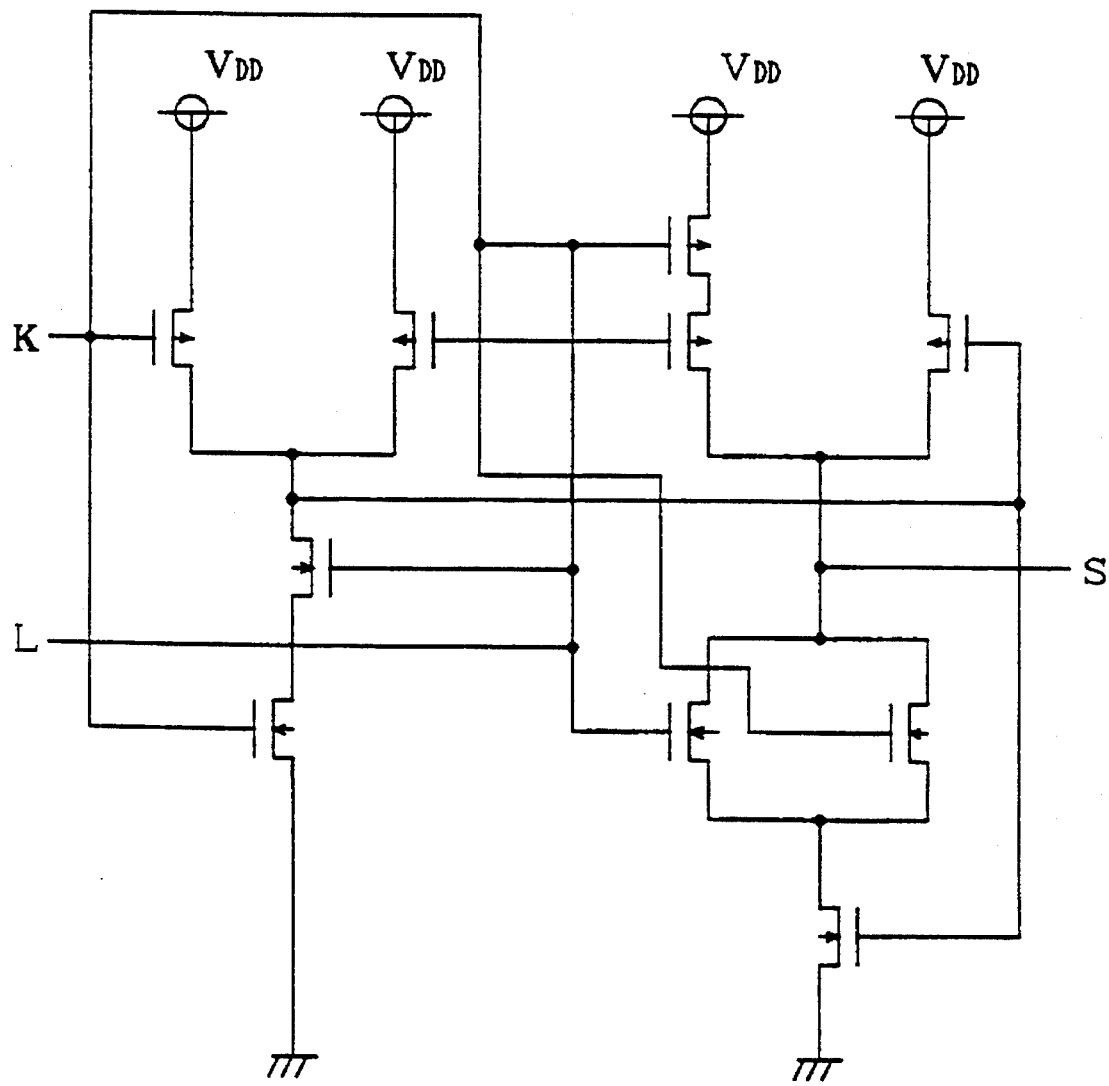

FIG. 5 is a circuitry diagram showing in detail a structure of the AND gate 14 of the half adder 7a and FIG. 6 is a circuitry diagram showing in detail a structure of the OR gate 16 of the rounding half adder 13. As can be understood by comparing FIG. 5 with FIG. 6, the gates 14 and 16 each equally require six transistors. FIG. 7 is a circuitry diagram showing in detail a structure of the EXOR gate 15 of the half adder 7a and FIG. 8 is a circuitry diagram showing in detail a structure of the EXNOR gate 17 of the rounding half adder 13. As is evident from comparison between FIGS. 7 and 8, the gates 15 and 17 each equally require ten transistors. Considering this in light of the structures shown in FIGS. 3 and 4, it can be understood that the circuit sizes of the half adders 7a and 13 are the same. Hence, the addition processing part 31b of the multiplier circuit 101 is realized in the same circuit size as that of the conventional addition processing part 30b.

On the other hand, since the rounding circuit 5 is not necessary for the multiplier circuit 101, the multiplier circuit 101 is formed in a smaller size than the conventional multiplier circuit 100. The reduction in the circuit size is advantageous as it is, and further advantageous in that high-speed operation is possible.

Figure 9:
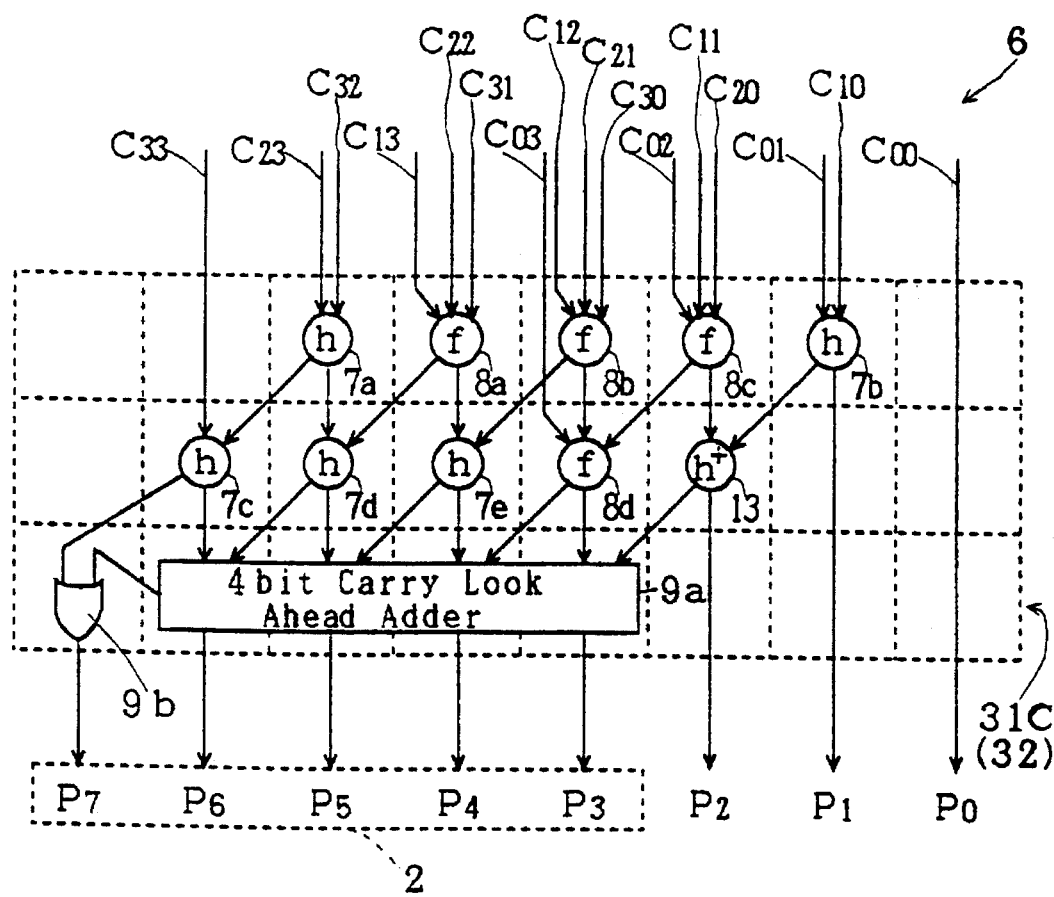
FIG. 9 is a circuit diagram for explaining a second preferred embodiment of the present invention.

(A-2) Second Preferred Embodiment:

A second preferred embodiment is an application of the present invention to a multiplication using the Wallace Tree. FIG. 9 is a circuitry diagram showing a structure of an addition processing part $31c$. The addition processing part $31c$ and the partial product generating part $31a$ which is shown in FIG. 1 form a multiplier part 32. At the multiplier part 32, a Wallace-Tree multiplier is formed.

That is, in the addition processing part $31c$ to which the partial product group 6 is to be inputted, a half adder $7a$, full adders $8a$, $8b$ and $8c$ and a half adder $7b$ are disposed in this order at the first stage. At the second stage, half adders $7c$, $7d$ and $7e$, a full adder $8d$ and a rounding half adder 13 are disposed in this order. At the third stage, an OR gate $9b$ and a 4-bit carry look ahead adder $9a$ are disposed in this order.

First, at the first stage, a partial product $C_{00}$ is not processed by any computation. The half adder $7a$ receives partial products $C_{23}$ and $C_{32}$, the full adder $8a$ receives partial products $C_{13}$, $C_{22}$ and $C_{31}$, the full adder $8b$ receives partial products $C_{12}$, $C_{21}$ and $C_{30}$, the full adder $8c$ receives partial products $C_{02}$, $C_{11}$ and $C_{20}$, the half adder $7b$ receives partial products $C_{01}$ and $C_{10}$. Each of the half and the full adders calculates the sum of the inputted partial products as a 2-bit value.

At the second stage, the half adder $7c$ receives a partial product $C_{33}$ and the higher bit of the output of the half adder $7a$ while the half adder $7d$ receives the lower bit of the output of the half adder $7a$ and the higher bit of the output of the full adder $8a$. The half adder $7e$ receives the lower bit of the output of the full adder $8a$ and the higher bit of the output of the full adder $8b$. The full adder $8d$ receives a partial product $C_{03}$, the lower bit of the output of the full adder $8b$ and the higher bit of the output of the full adder $8c$. The rounding half adder 13 receives the lower bit of the output of the full adder $8c$ and the higher bit of the output of the half adder $7b$. Each of the half and the full adders calculates the sum of the inputted partial products as a 2-bit value.

At the third stage, to the 4-bit carry look ahead adder $9a$, the lower bit of the output of the half adder $7c$ and the higher bit of the output of the half adder $7d$ are given as aligned to each other at one digit, the lower bit of the output of the half adder $7d$ and the higher bit of the output of the half adder $7e$ are given as aligned to each other at one digit, the lower bit of the output of the half adder $7e$ and the higher bit of the output of the full adder $8d$ are given as aligned to each other at one digit, and the lower bit of the output of the full adder $8d$ and the higher bit of the output of the rounding half adder 13 are given as aligned to each other at one digit. The OR gate $9b$ calculates a logical sum of a carry output (the most significant bit) of the carry look ahead adder $9a$ and the higher bit of the output of the half adder $7c$ so that the most significant bit $P_7$ of the multiplication result 2 is outputted. The carry look ahead adder $9a$ outputs the remaining higher bits ($P_6$ $P_5$ $P_4$ $P_3$) of the multiplication result 2.

Since the rounding half adder 13 is located at a position where the sixth most significant bit is to be calculated, an auxiliary number is added to the sixth most significant bit. Hence, the effect of the present invention is also assured where a multiplication using the Wallace Tree is to be performed. In other words, it is possible to obtain the multiplication result 2 which was rounded off at the sixth most significant bit without using an externally provided rounding circuit. More advantageously, the addition processing part $31c$ requires only a reduced number of the stages as compared with the addition processing part $31b$ of the first preferred embodiment.

Figure 10:
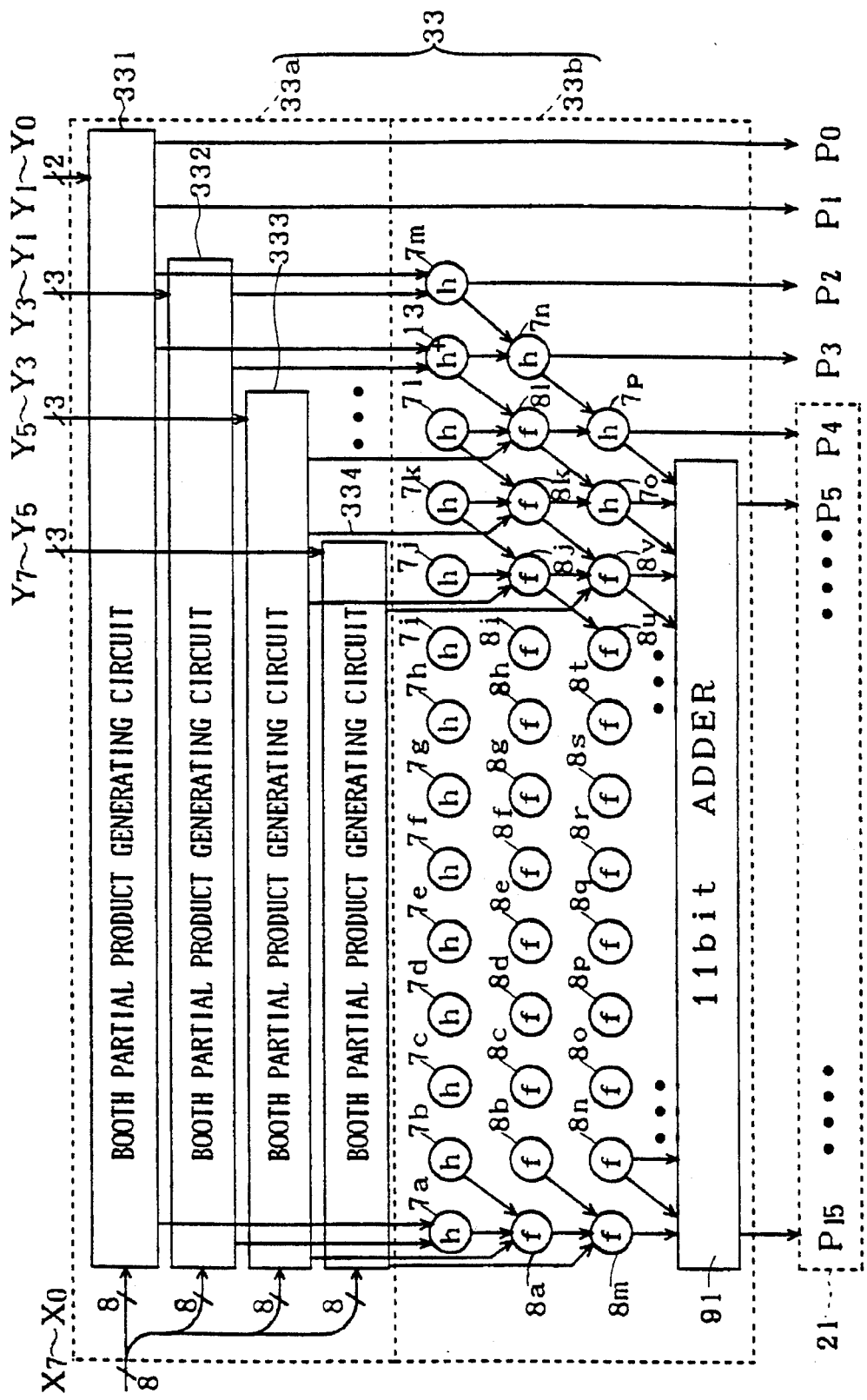
FIGS. 10 to 12 are circuit diagrams for explaining a third preferred embodiment of the present invention.

(A-3) Third Preferred Embodiment:

A third preferred embodiment is an application of the present invention to a multiplication using the Booth algorithm. FIG. 10 is a circuitry diagram showing a structure of a multiplier circuit 102 according to the present invention. The multiplier circuit 102 is supplied with an 8-bit multiplicand $X_7$-$X_0$ and an 8-bit multiplier Y which are negative numbers each expressed as a complement of 2. Without using an externally provided rounding circuit, a binary 12-bit multiplication result 21 (=$P_{15}$. . . $P_5$ $P_4$) rounded off at the thirteenth most significant bit is obtained.

The multiplier circuit 102 comprises a multiplier part 33 adopting the Booth algorithm. The multiplier part 33 is formed by a partial product generating part $33a$ and an addition processing part $33b$.

The product generating part $33a$ generates four partial products from the multiplicand $X_7$-$X_0$ and the multiplier $Y_7$-$Y_0$. The product generating part $33a$ comprises four types of Booth partial product generating circuits 331 to 334. The Booth partial product generating circuit 331 generates a 16-bit partial product from the multiplicand $X_7$-$X_0$ and the least two significant bits $Y_1$ $Y_0$ of the multiplier. The Booth partial product generating circuit 332 generates a 14-bit partial product from the multiplicand $X_7$-$X_0$ and the fifth, sixth and seventh most significant bits $Y_3$ $Y_2$ $Y_1$ of the multiplier. The Booth partial product generating circuit 333 generates a 12-bit partial product from the multiplicand $X_7$-$X_0$ and the third, fourth and fifth most significant bits $Y_5$ $Y_4$ $Y_3$ of the multiplier. The Booth partial product generating circuit 334 generates a 10-bit partial product from the multiplicand $X_7$-$X_0$ and the first, second and third most significant bits $Y_7$ $Y_6$ $Y_5$ of the multiplier.

These four types of partial products are inputted to the addition processing part $33b$ with their most significant bits aligned to each other. For clarity of illustration, FIG. 10 shows only the bits in the vicinity of the most and the least significant bits as being inputted to the addition processing part $33b$.

The addition processing part $33b$ is formed as a four-stage part. At the first stage, half adders $7a$ to $7l$, a rounding half adder 13 and a half adder $7m$ are disposed in this order from the higher bit side. At the second stage, full adders $8a$ to $8l$ and a half adder $7n$ are disposed in this order from the higher bit side. At the third stage, full adders $8m$ to $8v$ and half adders $7o$ and $7p$ are disposed in this order from the higher bit side. At the fourth, or the last stage, an 11-bit adder 91 is disposed.

Figure 11:
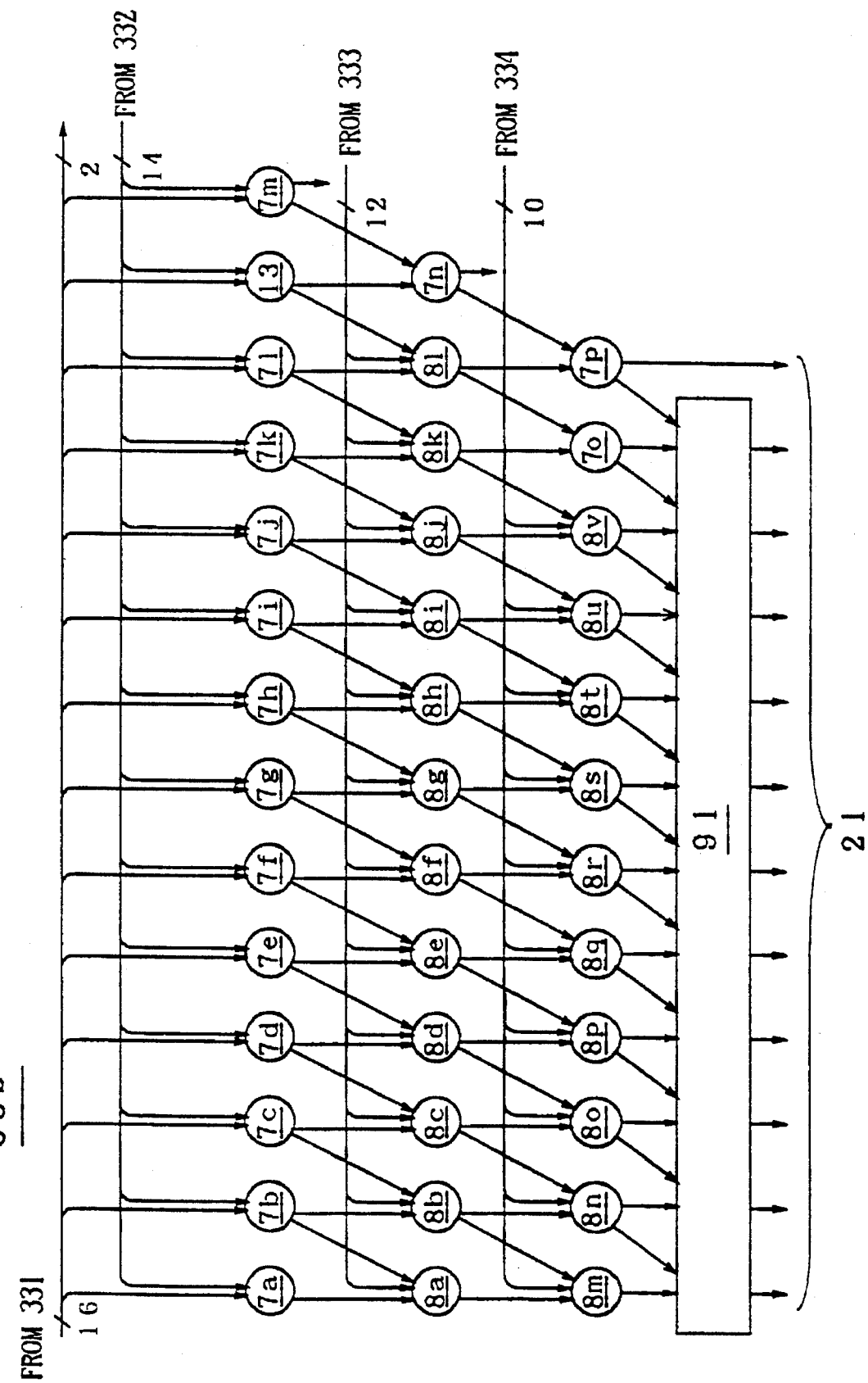

FIG. 11 is a circuitry diagram showing the structure of the addition processing part $33b$ in more detail than in FIG. 10. At the first stage, each bit of the output of the Booth partial product generating circuit 331 is given in a decreasing order from the most significant to the fourteenth bits to each one of the half adders $7a$ to $7l$, the rounding half adder 13 and the half adder $7m$. In addition, each bit of the output of the Booth partial product generating circuit 332 is given in a decreasing order from the most significant to each one of these adders.

Next, at the second stage, the full adder $8a$ receives the output of the half adder $7a$, the higher bit of the output of the half adder $7b$ and the most significant bit of the output of the Booth partial product generating circuit 333; the full adder $8b$ receives the lower bit of the output of the half adder $7b$, the higher bit of the output of the half adder $7c$ and the second significant bit of the output of the Booth partial product generating circuit 333; the full adder 8c receives the lower bit of the output of the half adder 7c, the higher bit of the output of the half adder 7d and the third significant bit of the output of the Booth partial product generating circuit 333; the full adder 8d receives the lower bit of the output of the half adder 7d, the higher bit of the output of the half adder 7e and the fourth significant bit of the output of the Booth partial product generating circuit 333; the full adder 8e receives the lower bit of the output of the half adder 7e, the higher bit of the output of the half adder 7f and the fifth significant bit of the output of the Booth partial product generating circuit 333; the full adder 8f receives the lower bit of the output of the half adder 7f, the higher bit of the output of the half adder 7g and the sixth significant bit of the output of the Booth partial product generating circuit 333; the full adder 8g receives the lower bit of the output of the half adder 7g, the higher bit of the output of the half adder 7h and the seventh significant bit of the output of the Booth partial product generating circuit 333; the full adder 8h receives the lower bit of the output of the half adder 7h, the higher bit of the output of the half adder 7i and the eighth significant bit of the output of the Booth partial product generating circuit 333; the full adder 8i receives the lower bit of the output of the half adder 7i, the higher bit of the output of the half adder 7j and the ninth significant bit of the output of the Booth partial product generating circuit 333; the full adder 8j receives the lower bit of the output of the half adder 7j, the higher bit of the output of the half adder 7k and the tenth significant bit of the output of the Booth partial product generating circuit 333; the full adder 8k receives the lower bit of the output of the half adder 7k, the higher bit of the output of the half adder 7l and the eleventh significant bit of the output of the Booth partial product generating circuit 333; and the full adder 8l receives the lower bit of the output of the half adder 7l, the higher bit of the output of the rounding half adder 13 and the twelfth significant bit of the output of the Booth partial product generating circuit 333. The half adder 7n receives the lower bit of the output of the rounding half adder 13 and the higher bit of the output of the half adder 7m.

Following this, at the third stage, the full adder 8m receives the output of the half adder 8a, the higher bit of the output of the half adder 8b and the most significant bit of the output of the Booth partial product generating circuit 334; the full adder 8n receives the lower bit of the output of the half adder 8b, the higher bit of the output of the half adder 8c and the second significant bit of the output of the Booth partial product generating circuit 334; the full adder 8o receives the lower bit of the output of the half adder 8c, the higher bit of the output of the half adder 8d and the third significant bit of the output of the Booth partial product generating circuit 334; the full adder 8p receives the lower bit of the output of the half adder 8d, the higher bit of the output of the half adder 8e and the fourth significant bit of the output of the Booth partial product generating circuit 334; the full adder 8q receives the lower bit of the output of the half adder 8e, the higher bit of the output of the half adder 8f and the fifth significant bit of the output of the Booth partial product generating circuit 334; the full adder 8r receives the lower bit of the output of the half adder 8f, the higher bit of the output of the half adder 8g and the sixth significant bit of the output of the Booth partial product generating circuit 334; the full adder 8s receives the lower bit of the output of the half adder 8g, the higher bit of the output of the half adder 8h and the seventh significant bit of the output of the Booth partial product generating circuit 334; the full adder 8t receives the lower bit of the output of the half adder 8h, the higher bit of the output of the half adder 8i and the eighth significant bit of the output of the Booth partial product generating circuit 334; the full adder 8u receives the lower bit of the output of the half adder 8i, the higher bit of the output of the half adder 8j and the ninth significant bit of the output of the Booth partial product generating circuit 334; and the full adder 8v receives the lower bit of the output of the half adder 8j, the higher bit of the output of the half adder 8k and the tenth significant bit of the output of the Booth partial product generating circuit 334. The half adder 7o receives the lower bit of the output of the full adder 8k and the higher bit of the output of the full adder 8l while the half adder 7p receives the lower bit of the output of the half adder 8l and the higher bit of the output of the half adder 7n.

At the fourth stage, to the 11-bit adder 91, the output of the full adder 8m and the higher bit of the output of the full adder 8n are given as aligned to each other at one digit, the lower bit of the output of the full adder 8n and the higher bit of the output of the full adder 8o are given as aligned to each other at one digit, the lower bit of the output of the full adder 8o and the higher bit of the output of the full adder 8p are given as aligned to each other at one digit, the lower bit of the output of the full adder 8p and the higher bit of the output of the full adder 8q are given as aligned to each other at one digit, the lower bit of the output of the full adder 8q and the higher bit of the output of the full adder 8r are given as aligned to each other at one digit, the lower bit of the output of the full adder 8r and the higher bit of the output of the full adder 8s are given as aligned to each other at one digit, the lower bit of the output of the full adder 8s and the higher bit of the output of the full adder 8t are given as aligned to each other at one digit, the lower bit of the output of the full adder 8t and the higher bit of the output of the full adder 8u are given as aligned to each other at one digit, the lower bit of the output of the full adder 8u and the higher bit of the output of the full adder 8v are given as aligned to each other at one digit, the lower bit of the output of the full adder 8v and the higher bit of the output of the half adder 7o are given as aligned to each other at one digit, and the lower bit of the output of the half adder 7o and the higher bit of the output of the half adder 7p are given as aligned to each other at one digit. As a result, the output of the adder 91 becomes the higher bits of the multiplication result 21 ($P_{15}$ to $P_5$). The least significant bit P4 of the multiplication result 21 is the lower bit of the output of the half adder 7p.

Since the rounding half adder 13 is located at a position where the thirteenth most significant bit is to be calculated, an auxiliary number is added to the thirteenth most significant bit. Hence, the effect of the present invention is also assured where a multiplication using the Booth algorithm is to be performed. In other words, it is possible to obtain the multiplication result 21 which was rounded at the thirteenth most significant bit without using an externally provided rounding circuit.

Figure 12:
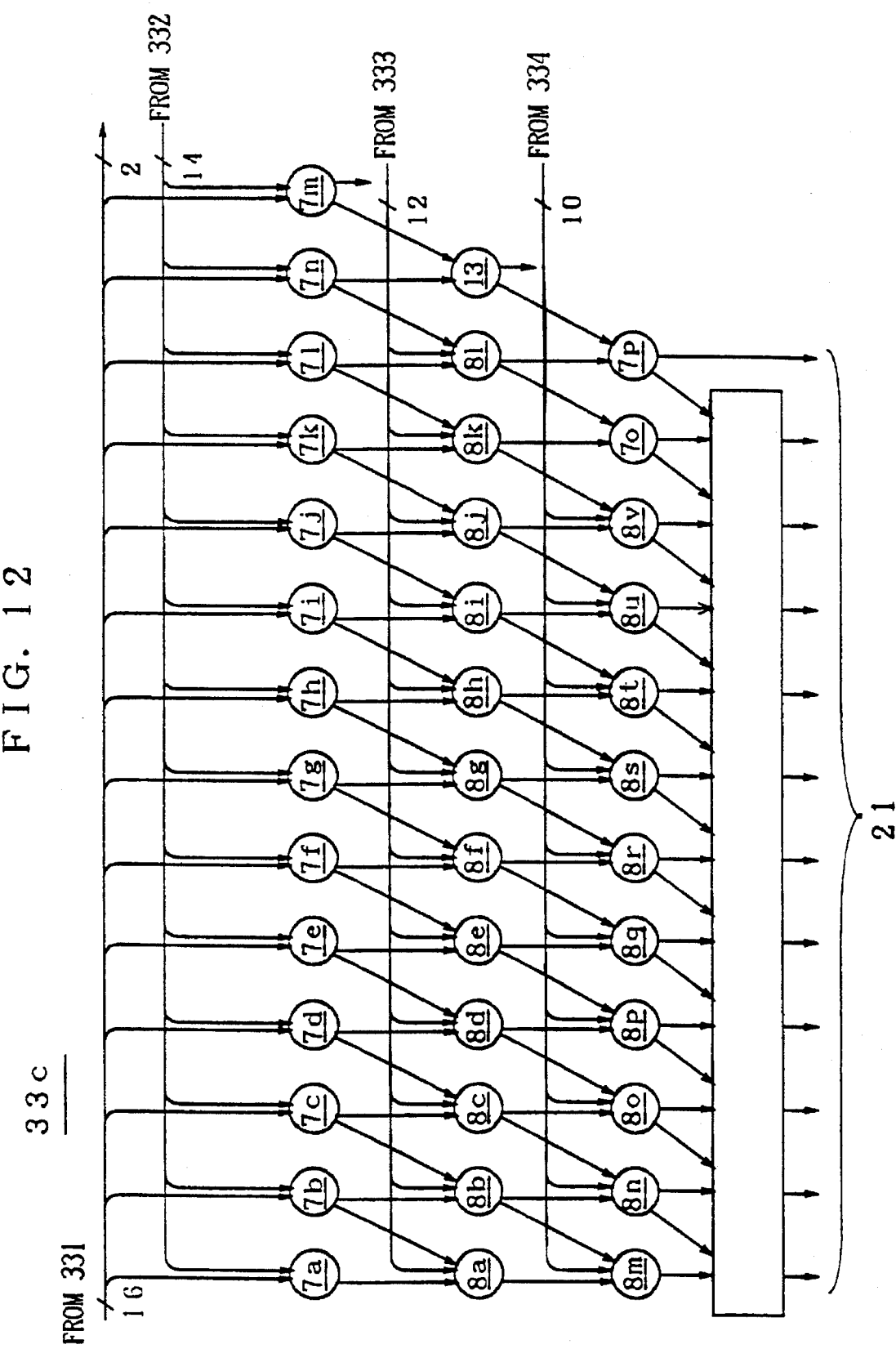

The rounding half adder 13 is located at a position where the thirteenth most significant bit is to be calculated as described above. It then follows that the rounding half adder 13 may be disposed at other stages, not necessarily at the first stage as in the case of the addition processing part 33b. FIG. 12 is a circuitry diagram of a addition processing part 33c which is equal in structure to the addition processing part 33b as it is modified so that the half adder 7n and the rounding half adder 13 are replaced with each other.

When the addition processing part 33c having such a structure is used in combination with the product generating part 33a, the present invention is applicable to a multiplication using the Booth algorithm.

B. Divider Circuit:

(B–0) Basic Idea:

A basic idea of the present invention will be described before discussing the details of the present invention. Assume an example where an 8-bit dividend A (=$A_7 A_6 \ldots A_0$) is divided by an 8-bit divisor B (=$B_7 B_6 \ldots B_0$>A) to obtain a rounded quotient which is smaller than 1. To obtain a division result which is rounded off to the eight decimal places, A÷B is to be calculated and $2^{-9}$ is to be added to the quotient. The wanted quotient which is rounded off to the eighth digit down from the radix point is obtained as a result. In short, Q=A÷B+$2^{-9}$ is to be calculated to the eight decimal places.

The equation above can be modified as Q=(A+B×$2^{-9}$)÷B. Hence, a desired calculation result is obtainable by dividing a newly adopted dividend (A+B×$2^{-9}$) by the divisor B to the eight decimal places.

Especially in this case, while the least significant bit has a weight (digit) of $2^0$, the most significant bit of B×$2^{-9}$ has a weight of $2^{-2}$. Therefore, a calculation result yielded from the new dividend (A+B×$2^{-9}$) is 17-bit data ($A_7 A_6 \ldots A_0$ 0 $B_7 B_6 \ldots B_1 B_0$) which should be divided by B to the digit of $2^{-8}$ (i.e., to the eighth digit down from the radix point). To this end, of the 17-bit data, the higher sixteen bits are needed, which implies that it is necessary to divide ($A_7 A_6 \ldots A_0$ 0 $B_7 B_6 \ldots B_1$) by ($B_7 B_6 \ldots B_0$). Hence, there is no need to newly provide the rounding circuit 5 as in the conventional technique or to calculate a quotient to the ninth digit down from the radix point, allowing omission of one stage from the structure of the quotient determining circuit.

Figure 13:
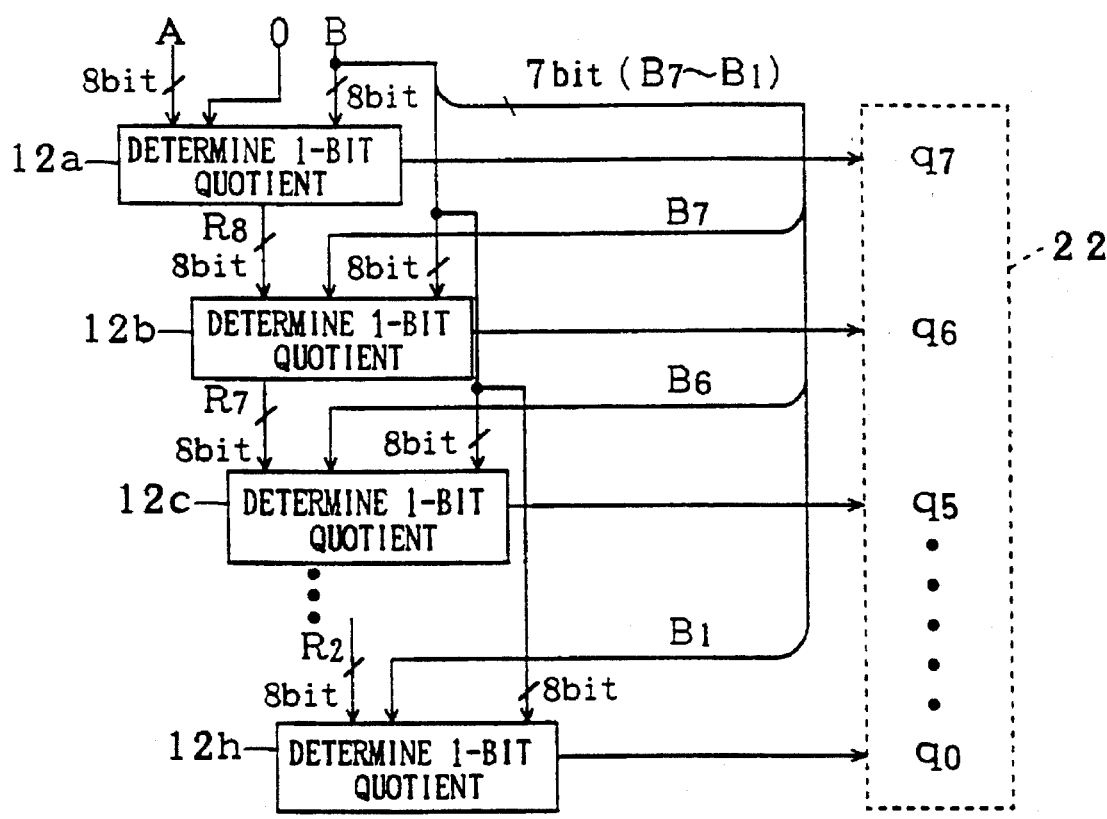
FIGS. 13 to 17 are circuit diagrams for explaining a fourth preferred embodiment of the present invention.

(B–1) Fourth Preferred Embodiment:

FIG. 13 is a circuitry diagram showing a structure of a division circuit 201 according to the present invention. The division circuit 201 is constructed to divide an 8-bit dividend A by an 8-bit divisor B (>A) and to round off the ninth digit down from the radix point to thereby obtain a quotient to the eighth digit down from the radix point. For this purpose, the division circuit 201 comprises 1-bit quotient determining parts 12a to 12h.

First, the 8-bit dividend A and the 8-bit divisor B are given to the 1-bit quotient determining part 12a. Since a relation A<B is satisfied, the value over the radix point is always 0. Hence, the value "0" is also given to the 1-bit quotient determining part 12a.

Figure 14:
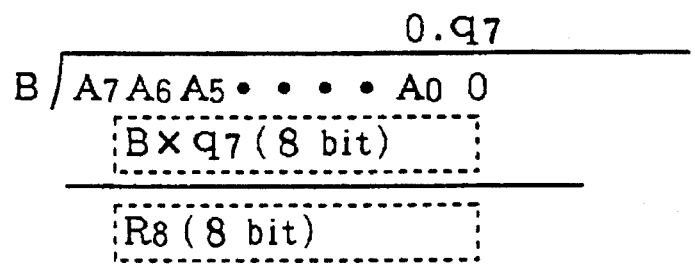

At the 1-bit quotient determining part 12a, the value "0" is added to the end of the 8-bit dividend A so that 9-bit data ($A_7 A_6 \ldots A_0$ 0) is generated. This data corresponds to the nine most significant bits of the new 17-bit dividend which has been explained in "(B–0) Basic Idea." Since a quotient for only one bit has to be determined at the 1-bit quotient determining part 12a, there is no need to calculate all digits of the new 17-bit dividend and to divide the 17-bit dividend by the divisor B. Rather, it is necessary only to add the 1-bit value "0" to the end of the 8-bit dividend A. In this manner, the quotient $q_7$ for the most significant digit and the 8-bit remainder $R_8$ are calculated at the 1-bit quotient determining part 12a. FIG. 14 is an explanatory diagram showing the calculation at the 1-bit quotient determining part 12a in the form of a calculation with figures.

Figure 15:
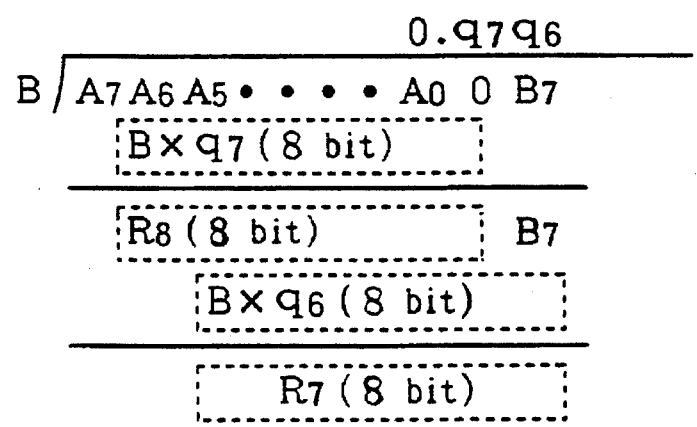

Next, the 8-bit remainder $R_8$ and the 8-bit divisor B are given to the 1-bit quotient determining part 12b. Further, in sharp contrast from the conventional technique, not only the value "0" but also the most significant value $B_7$ of the divisor B, which corresponds to the tenth most significant bit of the new dividend, are given to the 1-bit quotient determining part 12b. At the 1-bit quotient determining part 12b, the value $B_7$ is added to the end of the 8-bit remainder $R_8$ to generate 9-bit data which will be then divided by the divisor B. FIG. 15 is an explanatory diagram showing the calculation at the 1-bit quotient determining pan 12b in the form of a calculation with figures. As shown in FIG. 15, to add the value $B_7$ to the end of the 8-bit remainder $R_8$ and to thereafter divide the resultant value by the divisor B are, as far as determination of a 1-bit quotient for the second digit down from the radix point is concerned, equivalent to a division of the new 17-bit dividend by the devisor B. In this manner, the 1-bit quotient $q_6$ for the second digit down from the radix point and the 8-bit remainder $R_7$ are calculated at the 1-bit quotient determining part 12b.

In a similar manner, the 1-bit quotient determining parts 12c to 12h are respectively provided with remainders $R_7$ to $R_2$ which are calculated at the respective preceding 1-bit quotient determining pans 12b to 12g. As the divisor B is given, 1-bit values $B_6$ to $B_1$ which form the divisor B are also given to the 1-bit quotient determining pans 12c to 12h, and are respectively added to the ends of the remainders $R_7$ to $R_2$. The 1-bit quotient determining parts 12c to 12h output 1-bit quotients $q_5$ to $q_0$, respectively.

Thus, by adding a 1-bit value which forms the divisor to the end of the dividend at each 1-bit quotient determining pan, division of the new 17-bit dividend by the divisor B is substantially performed. Hence, as described in "(B–0) Basic Idea," it is possible to round off the ninth digit down from the radix point to thereby obtain a quotient which has eighth digit down from the radix point.

Figure 16:
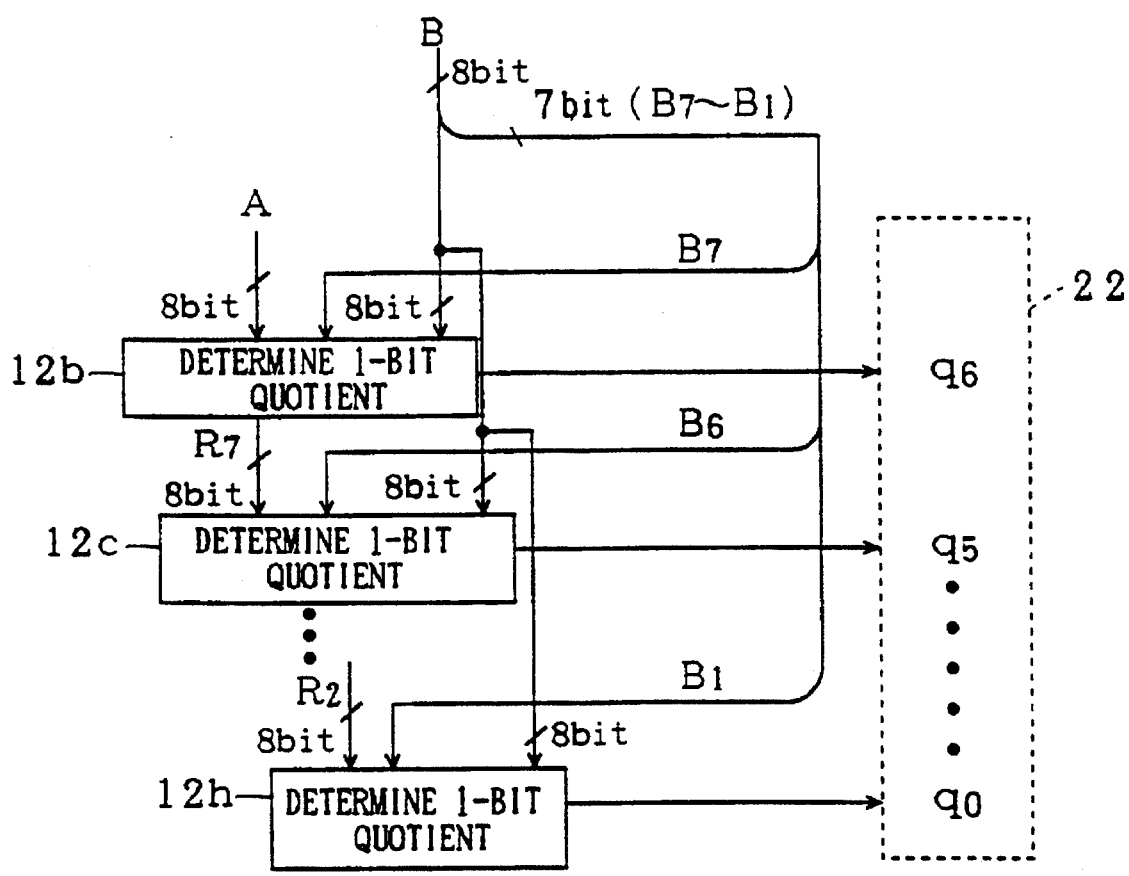

It is to be noted in a case where a quotient is to be calculated down to seventh digit from the radix point by dividing an 8-bit dividend A by an 8-bit divisor B (>A) and by thereafter rounding off the eighth digit, the new dividend is a 16-bit value ($A_7 A_6 \ldots A_0 B_7 B_6 \ldots B$), the 1-bit quotient determining part 12a is not necessary. FIG. 16 is a circuitry diagram showing a structure of a division circuit 201a which is to be used where such a calculation is to be performed. To the 1-bit quotient determining part 12b, the dividend A is given instead of the remainder $R_8$. At the 1-bit quotient determining part 12b, the value $B_7$ is added to the end of the dividend A. Calculations to follow are the same as those performed in the division circuit 201.

Figure 17:
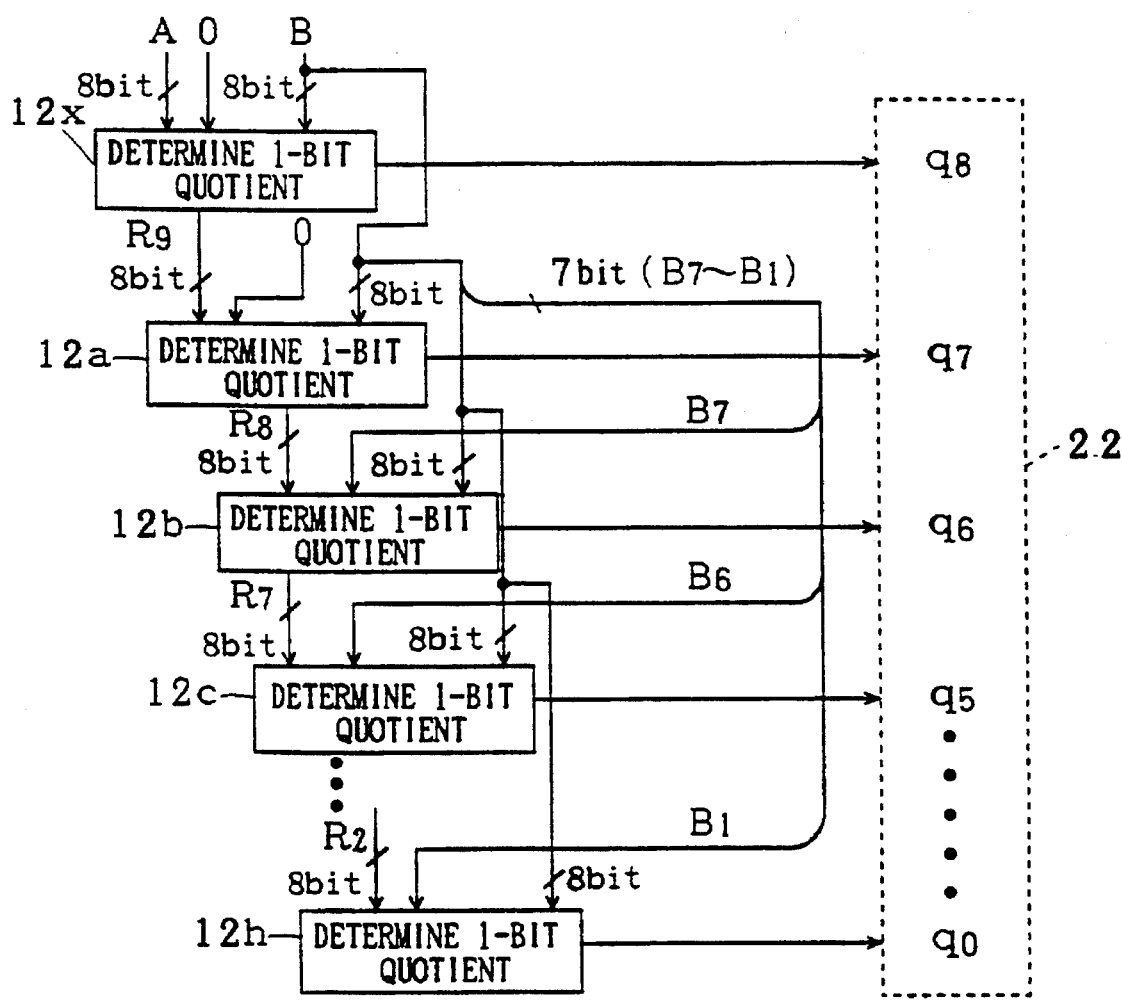

To calculate a quotient down to ninth digit from the radix point by dividing an 8-bit dividend A by an 8-bit divisor B (>A) and by thereafter rounding off the tenth place, an 18-bit value ($A_7 A_6 \ldots A_0 0 0 B_7 B_6 \ldots B$) has to be used as the new dividend. Hence, in this case, a new 1-bit quotient determining part 12x needs be provided. FIG. 17 is a circuitry diagram showing a structure of a division circuit 201b which is to be used where such a calculation is to be performed. The 1-bit quotient determining part 12x receives the dividend A, the divisor B and a 1-digit value "0," and divides the 9-bit number ($A_7 A_6 \ldots A_0$ 0) by the divisor B, whereby a 1-bit quotient $q_8$ and an 8-bit remainder $R_9$ are yielded. Next, at the 1-bit quotient determining part 12a, a 1-digit value "0" is added to the end of the remainder $R_9$. Calculations to follow are the same as those performed in the division circuit 201.

Unlike the conventional division circuit, the division circuits 201, 201a and 201b do not need the rounding circuit 5. In addition, these division circuits comprise one stage less of 1-bit quotient determining circuits. Moreover, the 1-bit quotient determining circuits used in these division circuits are the same in structure as those used in the conventional division circuit, and therefore the circuit size for one stage is approximately the same as that in the conventional division circuit. Hence, a smaller circuit size and a quicker operation are possible in these division circuits than in the conventional division circuit.

(B-2) Fifth Preferred Embodiment:

In the present invention, if the digit of the rounding-off position is located at an L-th digit down from the radix point, depending on a relation between the number of digits of a dividend M and the number L, the division circuit can have different structures. The fourth preferred embodiment corresponds to where there is a relation $L \geq M$, and therefore, "the new dividend" is calculated in a relatively simple manner. However, if the relation between L and M is $L < M$, in some cases, it is necessary to dispose an adder prior to the 1-bit quotient determining circuits. The fifth preferred embodiment deals with such a case.

Figure 18:
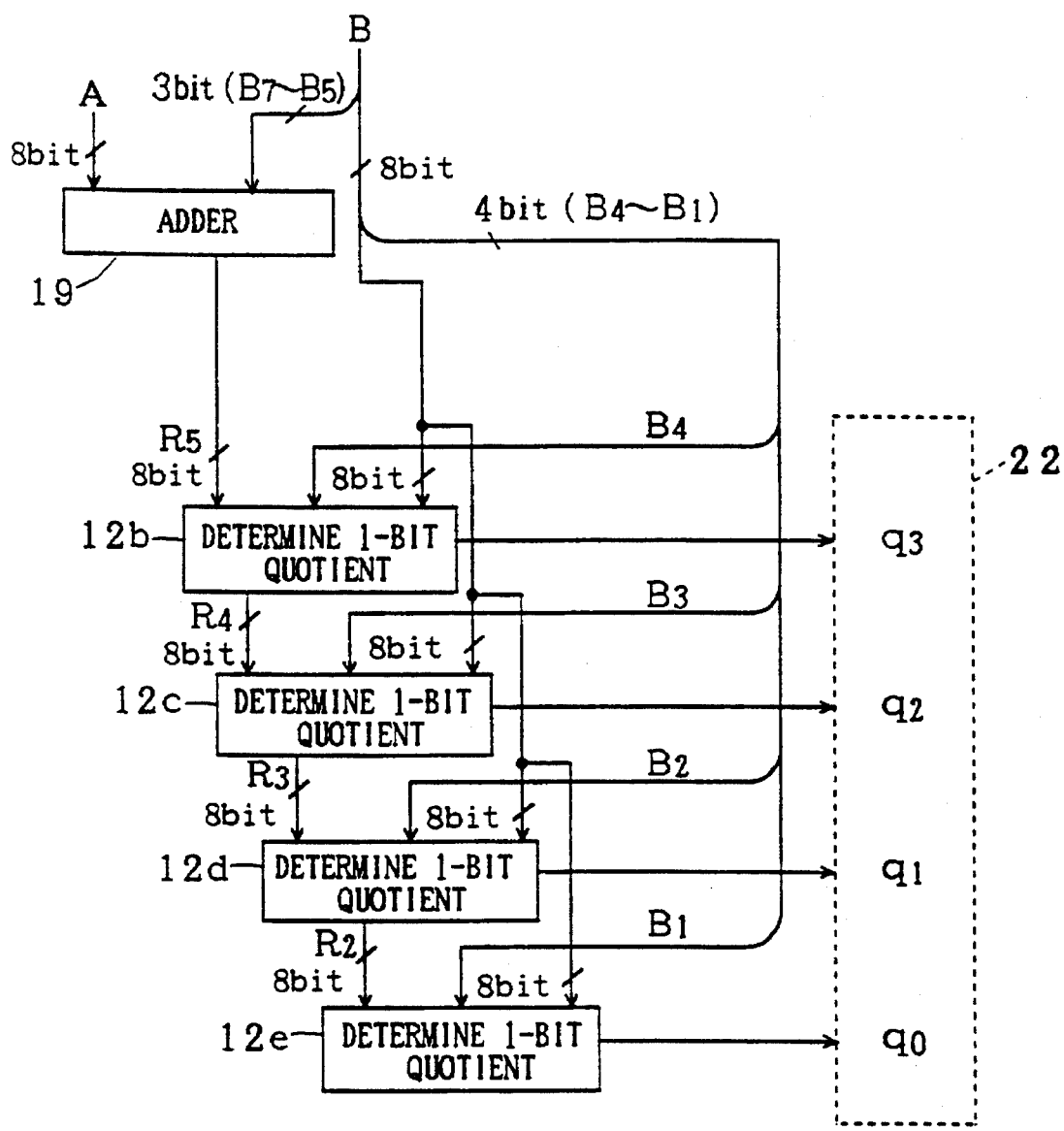
FIGS. 18 to 20 are circuit diagrams for explaining a fifth preferred embodiment of the present invention.

FIG. 18 is a circuitry diagram showing a structure of a division circuit 202 according to the present invention. The division circuit 202 is a circuit for dividing an 8-bit dividend A by an 8-bit divisor B (>A) and by thereafter rounding off the fifth digit down from the radix point in order to obtain a quotient which has four digits down from the radix point. The division circuit 202 comprises 1-bit quotient determining parts 12b to 12e and an adder 19.

From the new dividend $(A+B\times 2^{-5})$, 13 bits [$A_7$, $A_6$, $A_5$, $A_4$, $A_3$, $(A_2+B_7)$, $(A_1+B_6)$, $(A_0+B_5)$, $B_4$, $B_3$, $B_2$, $B_1$, $B_0$] are obtained as a calculation result. To this end, at the adder 19, the most three significant bits must be added to the least three significant bits of the dividend A. In other words, the dividend A and relatively higher three digits $B_7$, $B_6$ and $B_5$ which form the divisor B are given to the adder 19.

Now, assume that in the binary system, $A \div B < 0.11111$. In this case, a (rounded) quotient 22 to be calculated is smaller than 1 and therefore its value at the digit over the radix point is "0." Hence, an output $R_5$ of the adder 19 is expressed in 8 bits. The output $R_5$ corresponds to the eight most significant bits of the new dividend $(A+B\times 2^{-5})$.

Figure 19:
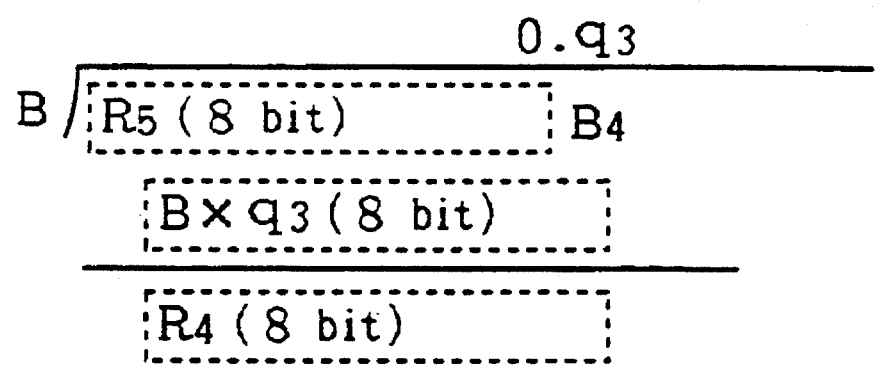

An output $R_5$ of the adder 19 and the divisor B are given to the 1-bit quotient determining part 12b. The fourth significant bit $B_4$ of the divisor B is also given to the 1-bit quotient determining part 12b and added to the end of the output $R_5$. The 1-bit quotient determining part 12b performs a division in a similar manner to the fourth preferred embodiment. FIG. 19 is an explanatory diagram showing the calculation at the 1-bit quotient determining part 12b in the form of a calculation with figures. As shown in FIG. 19, to add the value $B_4$ to the end of the output $R_5$ and to divide the resultant value by the divisor B are, as far as determination of a 1-bit quotient for the first significant bit from the radix point is concerned, equivalent to a division of the new 13-bit dividend by the devisor B. In this manner, at the 1-bit quotient determining part 12b, a quotient $q_3$ for the first significant bit from the radix point and an 8-bit remainder $R_4$ are calculated.

Following this, similarly to the fourth preferred embodiment, 1-bit quotients $q_2$, $q_1$ and $q_0$ are calculated in this order. By calculating the quotient $q_0$ which is at the fourth digit down from the radix point, the desired quotient 22 is obtained.

In the fifth preferred embodiment, similarly to the fourth preferred embodiment, it is not necessary to calculate the new dividend as a whole at one time. The division circuit according to this embodiment is formed only by the same number of 1-bit quotient determining parts as the number of digits which are to be calculated. While the rounding circuit 5 is not necessary, the adder 19 is needed. Thus, the circuit structure of the division circuit according to this embodiment comprises one stage less as compared with the conventional division circuit. This reduces the circuit size and attains a higher speed operation.

The present invention is also applicable to where $A \div B < 0.11111$ is not satisfied in the binary system. In this case, the (rounded) quotient 22 to be calculated is equal to or larger than 1, and its value at the digit over the radix point is "1." Hence, the output $R_5$ of the adder 19 is expressed in 9 bits. The output $R_5$ corresponds to the most nine significant bits of the new dividend $(A+B\times 2^{-5})$.

Figure 20:
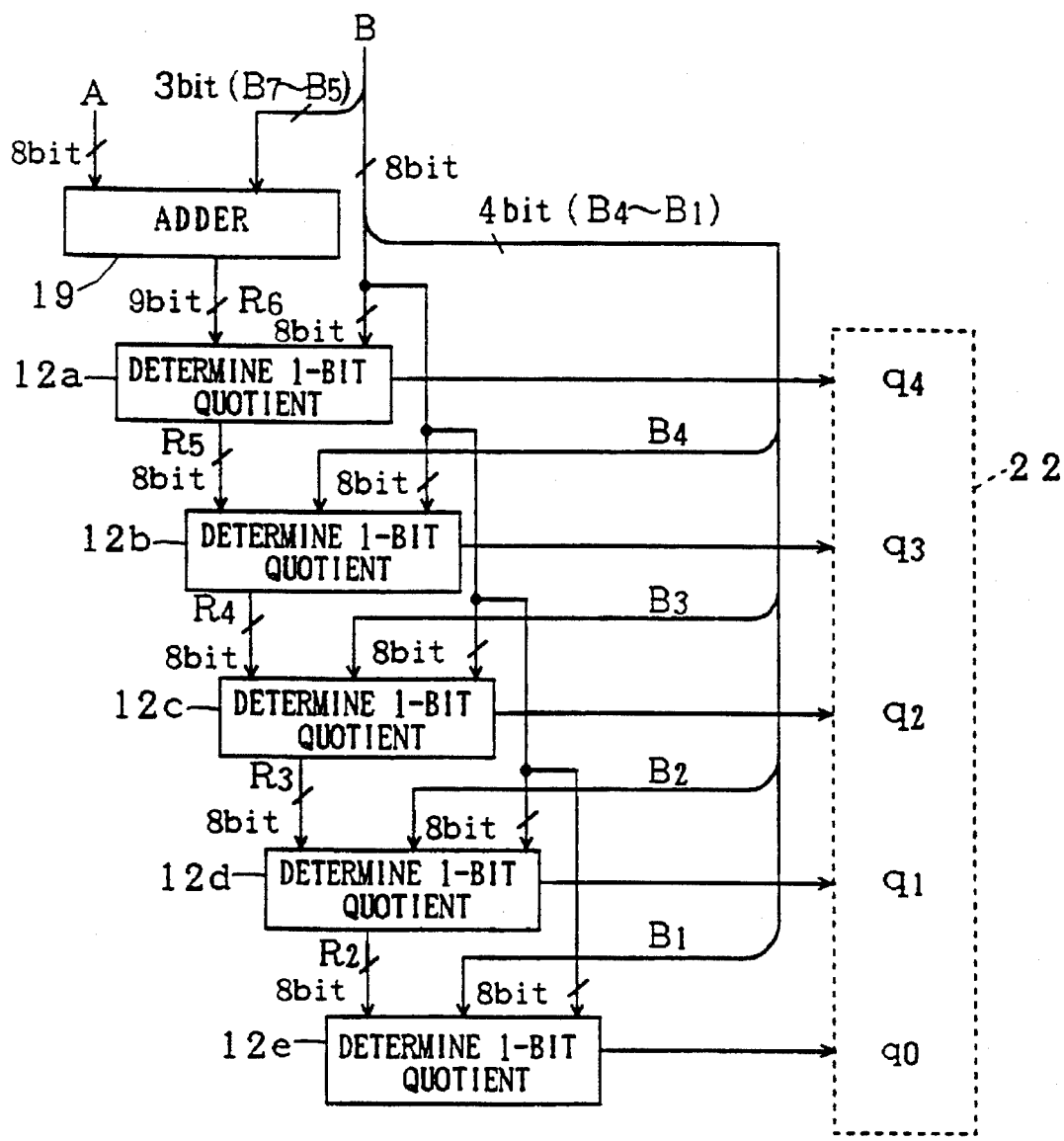
Figure 21:
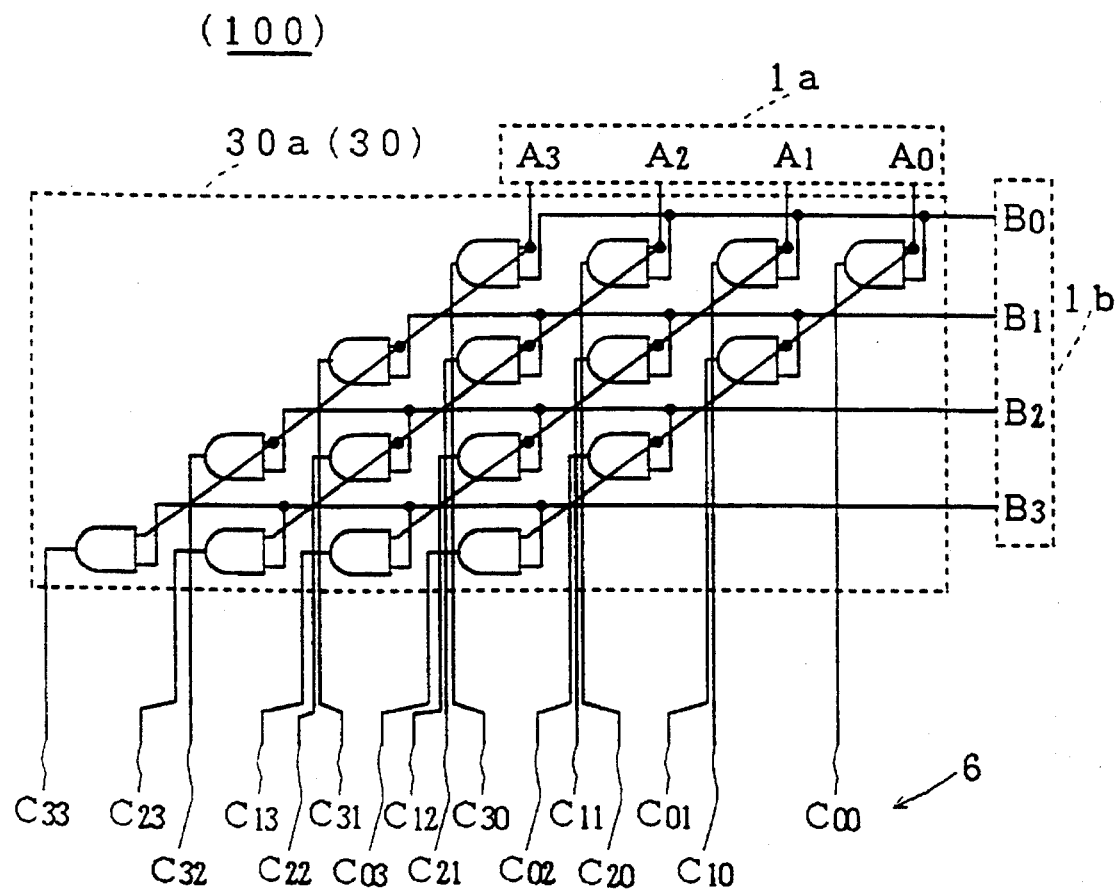
FIGS. 21 to 24 are circuit diagrams for explaining a conventional technique.

FIG. 20 is a circuitry diagram showing a structure of a division circuit 203 which is adaptive to where there is a possibility such a relation as above may exist between the dividend A and the divisor B. The division circuit 203 is equal in structure to the division circuit 202 as it is modified to newly comprise the 1-bit quotient determining part 12a between the adder 19 and the 1-bit quotient determining part 12b. In the same way as the adder 19 does in the division circuit 202, the adder 19 adds the relatively higher three bits $B_7$, $B_6$ and $B_5$ which form the divisor B to the dividend A while aligning the least significant bit of these three bits to the least significant bit of the dividend A. As a result, the 9-bit output $R_6$ is given from the adder 19 to the 1-bit quotient determining part 12a.

The 1-bit quotient determining part 12a is provided with the divisor B so that a quotient $q_4$ for the first bit over the radix point is calculated. If $A \div B < 0.11111$ in the binary system, the quotient $q_4$ is 0 and otherwise 1. The 1-bit quotient determining part 12a outputs the 8-bit remainder $R_5$ as well in addition to the quotient $q_4$.

Following this, calculations similar to those performed in the division circuit 202 are carried out to thereby yield the quotient 22 which is rounded off at the fifth digit down from the radix point and therefore which eventually has four digits.

For the division circuit 203, one more of the 1-bit quotient determining parts than the number of the decimal digits which are to be calculated needs be provided, which structure is the same as in the conventional division circuit. While the rounding circuit 5 is not necessary, the adder 19 is needed. Hence, a large reduction in the circuit size as compared with the conventional division circuit is impossible. However, whereas it is necessary to perform calculations down to a digit which is one digit lower than the digit to which a quotient is to be finally calculated in the conventional technique, in the division circuit 203, an already rounded result can be obtained serially from the most significant digit. This is advantageous in that the desired result is obtainable, although partially, from the most significant digit which has the most important information.

Although the preferred embodiments heretofore described all deal with where the values are all binary numbers, the present invention is applicable not only to a binary multiplication and a binary division. Rather, the present invention is generally applicable to a multiplication and a division of any other numerical system where the radix D is an integer which is equal to or larger than 2. In this case, as an auxiliary number to be used in the multiplier circuit, a minimum number which is equal to or larger than half the value D may be used.

While the invention has been described in detail, the foregoing description is in all aspects illustrative and not restrictive. It is understood that numerous other modifications and variations can be devised without departing from the scope of the invention.

I claim:

1. A multiplier circuit, comprising:
   (a) a partial product generating part for generating a plurality of partial products from a plurality of multiplicand elements and a plurality of multiplier elements, said multiplicand elements each being at least one digit which forms a multiplicand A $(=A_{(M-1)} \ldots A_1 A_0)$ which is expressed in M digits in a D-ary, said multiplier elements each being at least one digit which forms a multiplier B $(=B_{(N-1)} \ldots B_1 B_0)$ which is expressed in N digits in the D-ary; and
   (b) an addition processing part for adding up said partial products while aligning said partial products digit to digit to each other,
   wherein said addition processing part comprises (b–1) a rounding half adder which includes a first and a second input terminals for each receiving a 1-digit value and a first and a second output terminals, a value which is available at said first output terminal of said rounding half adder being a relatively higher digit of a sum of values which are given to said first and said second input terminals and an auxiliary number, a value which is available at said second output terminal of said rounding half adder being a relatively lower digit of the sum of the values which are given to said first and said second input terminals and said auxiliary number, said rounding half adder being located at a position which corresponds to the K-th most significant digit of a product E of said multiplicand A and said multiplier B.

2. The multiplier circuit of claim 1, wherein said auxiliary number is a minimum value which is equal to or larger than a half of said number D.

3. The multiplier circuit of claim 1, wherein said number D is 2 and said auxiliary number is 1.

4. The multiplier circuit of claim 3, wherein said rounding half adder comprises:
   (b–1–1) a first gate which includes a first, a second and a third terminals, said first terminal being connected to said first input terminal, said second terminal being connected to said second input terminal, said third terminal providing said first output terminal with an OR of values which are given to said first and said second terminals of said first gate; and
   (b–1–2) a second gate which includes a first, a second and a third terminals, said first terminal being connected to said first input terminal, said second terminal being connected to said second input terminal, said third terminal providing said second output terminal with an exclusive NOR of values which are given to said first and said second terminals of said second gate.

5. The multiplier circuit of claim 4, wherein said addition processing part further comprises:
   (b–2) a first adder group which is formed by (M–1) half adders;
   (b–3) a k-th adder group which is formed by (M–1) full adders $(2 \leq k \leq N-1)$; and
   (b–4) a carry look ahead adder which has input terminals for (M–1) digits and output terminals for M digits,
   wherein in said addition processing part,
   (c–1) one of said partial products $C_{(M-1)j}$ $(1 \leq j \leq N-2)$ is supplied to a most significant digit full adder of said (j+1)-th adder group;
   (c–2) one of said partial products $C_{ij}$ $(0 \leq i \leq M-2, 2 \leq j \leq N-1)$ is supplied to an (i+1)-th least significant digit full adder of said j-th adder group;
   (c–3) one of said partial products $C_{i1}$ $(0 \leq i \leq M-2)$ is supplied to an (i+1)-th least significant digit half adder of said first adder group;
   (c–4) one of said partial products $C_{i0}$ $(0 \leq i \leq M-1)$ is supplied to an i-th least significant digit half adder of said first adder group;
   (c–5) the most significant digit input terminal of said carry look ahead adder is provided with one of said partial products $C_{(M-1)(N-1)}$ and a relatively higher digit of an output of said most significant digit full adder of said (N–1)-th adder group;
   (c–6) a p-th least significant digit input terminal $(1 \leq p \leq (M-2))$ of said carry look ahead adder is provided with a relatively higher digit of an output of a p-th least significant digit full adder of said (N–1)-th adder group and a relatively lower digit of an output of a (p+1)-th least significant digit full adder of said (N–1)-th adder group;
   (c–7) a p-th least significant digit full adder of said j-th adder group $(3 \leq j \leq N-1)$ is provided with a relatively lower digit of an output of a (p+1)-th least significant digit full adder of said (j–1)-th adder group and a relatively higher digit of an output of a p-th least significant digit full adder of said (J–1)-th adder group;
   (c–8) the most significant digit full adder of said j-th adder group is further provided with a relatively higher digit of an output of the most significant digit full adder of said (j–1)-th adder group;
   (c–9) a p-th least significant digit full adder of said second adder group is provided with a relatively lower digit of an output of a (p+1)-th least significant digit half adder of said first adder group and a relatively higher digit of an output of a p-th least significant digit half adder of said first adder group; and
   (c–10) the most significant digit full adder of said second adder group is provided with a relatively higher digit of an output of the most significant digit half adder of said first adder group,
   and wherein of said first adder group, said half adder which is located at a position which corresponds to the K-th most significant digit of a product E is said rounding adder.

6. The multiplier circuit of claim 5, wherein said numbers M and N are equal to each other.

7. The multiplier circuit of claim 3, wherein said multiplier elements, said multiplicand elements and said partial products are all 1-digit value "0" or "1,"
   and wherein said partial product generating part comprises (a–1) M×N gates for each obtaining, as one of said partial products, a logical product $C_{mn}$ of one of said multiplicand elements $A_m$ which corresponds to the m-th digit of said multiplicand A $(0 \leq m \leq M-1)$ and one of said multiplier elements $B_n$ which corresponds to the n-th digit of said multiplier B $(0 \leq n \leq N-1)$.

8. The multiplier circuit of claim 7, wherein said addition processing part forms a Wallace tree circuit.

9. The multiplier circuit of claim 8, wherein said numbers M and N are equal to each other.

10. The multiplier circuit of claim 3, wherein said multiplier and said multiplicand are each expressed as a complement of 2 if they are negative numbers,
    said multiplicand corresponds to said multiplicand elements,
    said multiplier elements are formed by a plurality of digits which are successive in said multiplier, said partial product generating part comprises a plurality of Booth partial product generating circuits which generate said partial products according to the Booth algorithm, and said addition processing part adds up said partial products while aligning the most significant digits of said partial products to each other.

11. The multiplier circuit of claim 10, wherein said number N is an even number, said plural of multiplier elements are divided into a 0-th to an i-th 3-digit multiplier elements ($B_{2i+1}$ $B_{2i}$ $B_{2i-1}$) where $0 \leq i \leq (N-2)/2$ and $B_{-1} = 0$, said partial products are divided into a 0-th to an i-th partial products which are obtainable by performing a predetermined calculation on said multiplicand elements and said 0-th to said i-th multiplier elements, said addition processing part further comprises:

(b–2) a first adder group which includes a plurality of half adders which are provided in correspondence with said 0-th partial product except for the least two significant bits of said 0-th partial product and with said first partial product;

(b–3) a (j+1)-th adder group which includes:

(b–3–1) j half adders which are provided successively at the lower digit side, lower digit (j+1) outputs of said j adder group ($1 \leq j \leq (N-2)/2-1$) being given to said j-th adder group with their digits aligned to each other; and (b–3–2) full adders which are provided successively at the higher digit side, outputs of said j-th adder group and said (j+1)-th partial product being given to said full adders in correspondence with each other, and wherein of said half adders, one which is located at a position which corresponds to the K-th most significant digit of a product E is said rounding adder.

12. The multiplier circuit of claim 11, wherein said numbers M and N are equal to each other.

* * * * *